United States Patent
Taherzadeh Boroujeni et al.

(10) Patent No.: US 11,582,794 B2
(45) Date of Patent: Feb. 14, 2023

(54) FLEXIBLE MESSAGE REPETITION FOR RANDOM ACCESS PROCEDURES

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US); Yan Zhou, San Diego, CA (US); Hung Dinh Ly, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 160 days.

(21) Appl. No.: 17/127,120

(22) Filed: Dec. 18, 2020

(65) Prior Publication Data

US 2021/0250988 A1    Aug. 12, 2021

Related U.S. Application Data

(60) Provisional application No. 62/971,687, filed on Feb. 7, 2020.

(51) Int. Cl.
| | | |
|---|---|---|
| *H04W 4/00* | (2018.01) | |
| *H04W 74/00* | (2009.01) | |
| *H04W 72/04* | (2023.01) | |
| *H04W 72/0446* | (2023.01) | |
| *H04W 74/08* | (2009.01) | |

(52) U.S. Cl.
CPC ....... *H04W 74/008* (2013.01); *H04W 72/042* (2013.01); *H04W 72/0446* (2013.01); *H04W 74/006* (2013.01); *H04W 74/0833* (2013.01)

(58) Field of Classification Search
CPC ............ H04W 74/008; H04W 72/042; H04W 72/0446; H04W 74/006; H04W 74/0833
See application file for complete search history.

(56) References Cited

U.S. PATENT DOCUMENTS

| | | | |
|---|---|---|---|
| 2017/0013643 A1* | 1/2017 | Nan | H04W 74/006 |
| 2017/0280481 A1* | 9/2017 | Stern-Berkowitz | H04L 1/1854 |
| 2018/0069593 A1* | 3/2018 | Yl | H04W 4/70 |
| 2020/0221502 A1* | 7/2020 | Pjanic | H04W 72/042 |
| 2021/0282042 A1* | 9/2021 | Park | H04B 17/309 |

* cited by examiner

*Primary Examiner* — Siren Wei
(74) *Attorney, Agent, or Firm* — Holland & Hart LLP

(57) ABSTRACT

Methods, systems, and devices for wireless communications are described. A user equipment (UE) may receive signaling indicating a configuration for communicating to the UE a random access response of a random access procedure. The configuration may indicate a first quantity of instances of control information associated with the random access response in a set of slots and a portion of the time window configured for the first quantity of instances. The UE may monitor the set of slots for instances of the control information and receive a second quantity of instances of the control information for the UE in a first subset of slots of the set of slots. The second quantity of instances may be less than the first quantity of instances. The UE may combine the instances of the control information from the first subset of slots and decode the random access response based on combining the instances.

30 Claims, 18 Drawing Sheets

FLEXIBLE MESSAGE REPETITION FOR RANDOM ACCESS PROCEDURES

CROSS REFERENCE

The present Application for Patent claims the benefit of U.S. Provisional Patent Application No. 62/971,687 by TAHERZADEH BOROUJENI et al., entitled "FLEXIBLE MESSAGE REPETITION FOR RANDOM ACCESS PROCEDURES," filed Feb. 7, 2020, assigned to the assignee hereof, and expressly incorporated by reference herein.

FIELD OF TECHNOLOGY

The following relates generally to wireless communications and more specifically to flexible message repetition for random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support one or more random access procedures for establishing a connection between a UE and a base station. Examples of random access procedures may include a four-step random access channel (RACH) procedure (4-step RACH procedure) and a two-step random access channel procedure (2-step RACH procedure). As demand for communication efficiency increases, some wireless communications systems, such as 4G and 5G systems, may be unable to support high reliability or low latency random access communications, among other examples.

SUMMARY

Various aspects of the described techniques relate to configuring a communication device, which may be a user equipment (UE), to support flexible message repetition for random access procedures, such as a two-step random access channel procedure (4-step RACH procedure) or a four-step random access channel procedure (4-step RACH procedure). The described techniques may be used to configure the UE with a configuration (e.g., a physical downlink control channel (PDCCH) repetition configuration) to improve reliability of the random access procedure. In some examples, the UE may receive the configuration from another communication device, such as a base station (e.g., a next-generation NodeBs or giga-NodeBs (either of which may be referred to as a gNB)). The configuration may indicate a quantity of instances of control information associated with a random access response message (e.g., data associated with a random access response) and over a random access response window associated with the random access procedure. In some cases, the random access response may include the control information carried in the PDCCH and the data carried in a physical downlink shared channel (PDSCH). As such, a portion of the random access response may be carried by the PDCCH and another portion of the random access response may be carried by the PDSCH. In some aspects, the data carried in the PDSCH of the random access response may include the random access response message.

The quantity of instances of the control information may include two or more repetitions of the control information over two or more time and frequency resources (e.g., mini-slots, slots, subcarriers, carriers, and the like). As such, a UE or a base station, or both, may be configured to support more robust random access procedures, for example, in 4G or 5G systems, by improving reliability of the random access procedure as a result of providing flexible repetition of the control information associated with the random access message. For example, by supporting flexible message repetition, the UE or the base station, or both, may experience reduced latencies associated with processes related to initial channel access (e.g., minimize delay due to failed decoding of random access messages, or the like). The described techniques may also include features for improvements to power consumption and, in some examples, may promote enhanced efficiency for high reliability and low latency operations in 5G systems, among other benefits.

A method for wireless communication at a UE is described. The method may include receiving, from a base station, signaling indicating a configuration for a time window for communicating to the UE a random access response of a random access procedure, the configuration indicating a first quantity of instances of control information associated with the random access response in a set of multiple slots, and at least a portion of the time window configured for transmitting the first quantity of instances, monitoring, during the time window according to the configuration, the set of multiple slots for instances of the control information, receiving a second quantity of instances of the control information for the UE in a first subset of slots of the set of multiple slots, the second quantity of instances less than the first quantity of instances, and a second subset of slots of the set of multiple slots including a third quantity of instances of other control information associated with random access responses for one or more other UEs, combining the instances of the control information from the first subset of slots, and decoding the random access response received as part of the random access procedure based on combining the instances.

An apparatus for wireless communication at a UE is described. The apparatus may include a processor, memory in electronic communication with the processor, and instructions stored in the memory. The instructions may be executable by the processor to cause the apparatus to receive, from a base station, signaling indicating a configuration for a time window for communicating to the UE a random access response of a random access procedure, the configuration indicating a first quantity of instances of control information associated with the random access response in a set of multiple slots, and at least a portion of the time window configured for transmitting the first quantity of instances, monitor, during the time window according to the configuration, the set of multiple slots for instances of the control information, receive a second quantity of instances of the control information for the UE in a first subset of slots of the set of multiple slots, the second quantity of instances less than the first quantity of instances, and a second subset of slots of the set of multiple slots including a third quantity of instances of other control information associated with random access responses for one or more other UEs, combine the instances of the control information from the first subset of slots, and decode the random access response received as part of the random access procedure based on combining the instances.

Another apparatus for wireless communication at a UE is described. The apparatus may include means for receiving, from a base station, signaling indicating a configuration for a time window for communicating to the UE a random access response of a random access procedure, the configuration indicating a first quantity of instances of control information associated with the random access response in a set of multiple slots, and at least a portion of the time window configured for transmitting the first quantity of instances, means for monitoring, during the time window according to the configuration, the set of multiple slots for instances of the control information, means for receiving a second quantity of instances of the control information for the UE in a first subset of slots of the set of multiple slots, the second quantity of instances less than the first quantity of instances, and a second subset of slots of the set of multiple slots including a third quantity of instances of other control information associated with random access responses for one or more other UEs, means for combining the instances of the control information from the first subset of slots, and means for decoding the random access response received as part of the random access procedure based on combining the instances.

A non-transitory computer-readable medium storing code for wireless communication at a UE is described. The code may include instructions executable by a processor to receive, from a base station, signaling indicating a configuration for a time window for communicating to the UE a random access response of a random access procedure, the configuration indicating a first quantity of instances of control information associated with the random access response in a set of multiple slots, and at least a portion of the time window configured for transmitting the first quantity of instances, monitor, during the time window according to the configuration, the set of multiple slots for instances of the control information, receive a second quantity of instances of the control information for the UE in a first subset of slots of the set of multiple slots, the second quantity of instances less than the first quantity of instances, and a second subset of slots of the set of multiple slots including a third quantity of instances of other control information associated with random access responses for one or more other UEs, combine the instances of the control information from the first subset of slots, and decode the random access response received as part of the random access procedure based on combining the instances.

Some examples of the method, apparatuses, and non-transitory computer-readable medium described herein may further include operations, features, means, or instructions for attempting to decode the control information by combining signals received on a set of multiple different subsets of slots of the set of multiple slots, the set of multiple different subsets of slots including the first subset of slots and the second subset of slots.

In some examples of the method, apparatuses, and non-transitory computer-readable medium described herein, the combining of the instances of the control information may include operations, features, means, or instructions for combining the instances of the control information from both the first subset of slots and the second subset of slots, where the decoding the random access response may be based on the combining the instances of the control information from both the first subset of slots and the second subset of slots.

Some examples of the method, apparatuses, and non-transitory computer-readable medium described herein may further include operations, features, means, or instructions for identifying, based at last in part on the configuration, the first quantity of instances of the control information for the random access response in the first subset of slots of the set of multiple slots, where the monitoring the set of multiple slots for the instances of the control information for the UE may be based on the first quantity of instances.

In some examples of the method, apparatuses, and non-transitory computer-readable medium described herein, the first quantity of instances of the control information corresponds to a maximum repetition value of the control information.

Some examples of the method, apparatuses, and non-transitory computer-readable medium described herein may further include operations, features, means, or instructions for receiving, from the base station, an indication of a quantity of instances of the control information for the random access response in the first subset of slots of the set of multiple slots.

In some examples of the method, apparatuses, and non-transitory computer-readable medium described herein, the monitoring of the set of multiple slots for the instances of the control information for the UE may include operations, features, means, or instructions for monitoring the first subset of slots of the set of multiple slots based on receiving the indication of the quantity of instances of the control information.

In some examples of the method, apparatuses, and non-transitory computer-readable medium described herein, the quantity of instances of the control information correspond to a repetition of the control information over the first subset of slots of the set of multiple slots.

In some examples of the method, apparatuses, and non-transitory computer-readable medium described herein, the quantity of instances of the control information for the random access response in the first subset of slots may be less than a threshold quantity of instances of the control information for the random access response in the first subset of slots.

In some examples of the method, apparatuses, and non-transitory computer-readable medium described herein, the second quantity of instances of the control information associated with the random access response in the first subset of slots may be based on receiving the indication and an aggregation level for a control channel carrying the control information.

Some examples of the method, apparatuses, and non-transitory computer-readable medium described herein may further include operations, features, means, or instructions for receiving system information including an indicator of the configuration for the time window, where the system information includes a remaining minimum system information, a system information block, or a master information block, or any combination thereof.

Some examples of the method, apparatuses, and non-transitory computer-readable medium described herein may further include operations, features, means, or instructions for performing a parity check on the combination of the instances of the random access response, the parity check including a cyclic redundancy check, where decoding the random access response may be based on performing the parity check.

In some examples of the method, apparatuses, and non-transitory computer-readable medium described herein, the instances of the control information may be carried on a physical downlink control channel.

In some examples of the method, apparatuses, and non-transitory computer-readable medium described herein, the first subset of slots or the second subset of slots, or both, may be consecutive slots of the set of multiple slots.

In some examples of the method, apparatuses, and non-transitory computer-readable medium described herein, at least two slots of the first subset of slots may be non-consecutive slots of the set of multiple slots.

In some examples of the method, apparatuses, and non-transitory computer-readable medium described herein, a sum of the second quantity of instances of the control information and the third quantity of instances of the other control information may be equal to the first quantity of instances of the control information.

A method for wireless communication at a base station is described. The method may include transmitting, to a UE, signaling indicating a configuration for a time window for communicating a random access response of a random access procedure, the configuration indicating a first quantity of instances of control information associated with the random access response in a set of multiple slots, and at least a portion of the time window configured for transmitting the first quantity of instances, receiving, from the UE, a random access request of the random access procedure, selecting, for the time window in response to the random access request, a first subset of slots of the set of multiple slots to use to transmit a second quantity of instances of the control information to the UE according to the configuration, the second quantity of instances less than the first quantity of instances, and a second subset of slots of the set of multiple slots including a third quantity of instances of other control information associated with random access responses for one or more other UEs, and transmitting the second quantity of instances of the control information for the UE in the first subset of slots and the third quantity of instances of the other control information for the one or more other UEs in the second subset of slots.

An apparatus for wireless communication at a base station is described. The apparatus may include a processor, memory in electronic communication with the processor, and instructions stored in the memory. The instructions may be executable by the processor to cause the apparatus to transmit, to a UE, signaling indicating a configuration for a time window for communicating a random access response of a random access procedure, the configuration indicating a first quantity of instances of control information associated with the random access response in a set of multiple slots, and at least a portion of the time window configured for transmitting the first quantity of instances, receive, from the UE, a random access request of the random access procedure, select, for the time window in response to the random access request, a first subset of slots of the set of multiple slots to use to transmit a second quantity of instances of the control information to the UE according to the configuration, the second quantity of instances less than the first quantity of instances, and a second subset of slots of the set of multiple slots including a third quantity of instances of other control information associated with random access responses for one or more other UEs, and transmit the second quantity of instances of the control information for the UE in the first subset of slots and the third quantity of instances of the other control information for the one or more other UEs in the second subset of slots.

Another apparatus for wireless communication at a base station is described. The apparatus may include means for transmitting, to a UE, signaling indicating a configuration for a time window for communicating a random access response of a random access procedure, the configuration indicating a first quantity of instances of control information associated with the random access response in a set of multiple slots, and at least a portion of the time window configured for transmitting the first quantity of instances, means for receiving, from the UE, a random access request of the random access procedure, means for selecting, for the time window in response to the random access request, a first subset of slots of the set of multiple slots to use to transmit a second quantity of instances of the control information to the UE according to the configuration, the second quantity of instances less than the first quantity of instances, and a second subset of slots of the set of multiple slots including a third quantity of instances of other control information associated with random access responses for one or more other UEs, and means for transmitting the second quantity of instances of the control information for the UE in the first subset of slots and the third quantity of instances of the other control information for the one or more other UEs in the second subset of slots.

A non-transitory computer-readable medium storing code for wireless communication at a base station is described. The code may include instructions executable by a processor to transmit, to a UE, signaling indicating a configuration for a time window for communicating a random access response of a random access procedure, the configuration indicating a first quantity of instances of control information associated with the random access response in a set of multiple slots, and at least a portion of the time window configured for transmitting the first quantity of instances, receive, from the UE, a random access request of the random access procedure, select, for the time window in response to the random access request, a first subset of slots of the set of multiple slots to use to transmit a second quantity of instances of the control information to the UE according to the configuration, the second quantity of instances less than the first quantity of instances, and a second subset of slots of the set of multiple slots including a third quantity of instances of other control information associated with random access responses for one or more other UEs, and transmit the second quantity of instances of the control information for the UE in the first subset of slots and the third quantity of instances of the other control information for the one or more other UEs in the second subset of slots.

Some examples of the method, apparatuses, and non-transitory computer-readable medium described herein may further include operations, features, means, or instructions for identifying, based at last in part on the configuration, the first quantity of instances of the control information for the UE in the first subset of slots of the set of multiple slots, where the transmitting the second quantity of instances of the control information for the UE in the first subset of slots may be based on the first quantity of instances of the control information for the UE.

In some examples of the method, apparatuses, and non-transitory computer-readable medium described herein, a threshold quantity of instances of the control information for the random access response in the first subset of slots corresponds to a threshold repetition of the control information in the first subset of slots of the set of multiple slots.

Some examples of the method, apparatuses, and non-transitory computer-readable medium described herein may further include operations, features, means, or instructions for transmitting an indication of a quantity of instances of the control information for the UE in the first subset of slots of the set of multiple slots, where the transmitting the second quantity of instances of the control information for the UE in the first subset of slots may be based on the transmitting the indication of the quantity of instances of the control information for the UE.

Some examples of the method, apparatuses, and non-transitory computer-readable medium described herein may further include operations, features, means, or instructions for transmitting a configuration indicating the set of multiple slots for the UE to receive the second quantity of instances of the control information in the first subset of slots of the set of multiple slots.

In some examples of the method, apparatuses, and non-transitory computer-readable medium described herein, the first quantity of instances of the control information associated with the random access response in the set of multiple slots may be based on an aggregation level for a control channel carrying the control information.

In some examples of the method, apparatuses, and non-transitory computer-readable medium described herein, the second quantity of instances of the control information for the UE in the first subset of slots may be based on the transmitted signaling indicating the configuration for the time window and an aggregation level for a control channel carrying the control information.

Some examples of the method, apparatuses, and non-transitory computer-readable medium described herein may further include operations, features, means, or instructions for transmitting system information including an indicator of the configuration for the time window, where the system information includes a remaining minimum system information, a system information block, or a master information block, or a combination thereof.

In some examples of the method, apparatuses, and non-transitory computer-readable medium described herein, the second quantity of instances of the control information may be carried on a physical downlink control channel.

In some examples of the method, apparatuses, and non-transitory computer-readable medium described herein, the first subset of slots or the second subset of slots, or both, may be consecutive slots of the set of multiple slots.

In some examples of the method, apparatuses, and non-transitory computer-readable medium described herein, at least two slots of the first subset of slots may be non-consecutive slots of the set of multiple slots.

In some examples of the method, apparatuses, and non-transitory computer-readable medium described herein, a sum of the second quantity of instances of the control information and the third quantity of instances of the other control information may be equal to the first quantity of instances of the control information.

DETAILED DESCRIPTION

Figure 1:
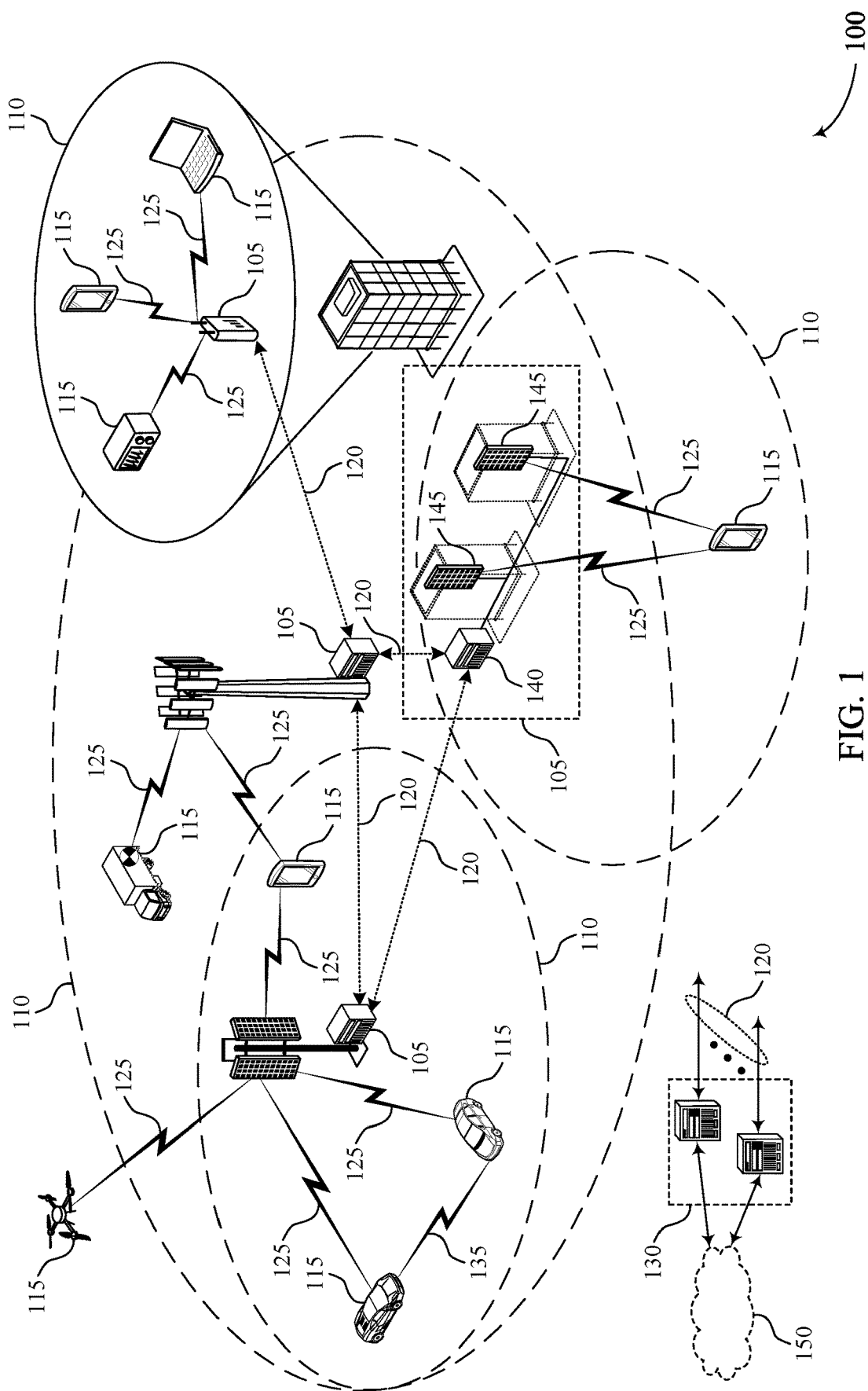
FIGS. 1 and 2 illustrate examples of wireless communications systems that support flexible message repetition for random access procedures in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support flexible message repetition for a random access procedure, such as a two-step or four-step random access channel procedure (2-step or 4-step RACH procedure).

As part of a random access procedure (e.g., a 2-step or 4-step RACH procedure), UEs may transmit a first message of the random access procedure, which may be a random access request (e.g., a message 1 (msg 1) or message A (msgA)) to base stations. For example, the UEs may transmit a physical random access channel (PRACH) preamble in the first message to the base stations indicating resource requirements of the UEs to initiate the random access procedure. The base stations may acknowledge the random access request by transmitting a random access response (e.g., a message 2 (or msg 2)) to the UEs. The message 2 may include control information and a random access response message, and the UEs may expect to receive the random access response message during a time window (e.g., a random access response window). The base stations may transmit the control information via a physical downlink control channel (PDCCH) to indicate a location (e.g., a frequency and a time) for where the UEs may receive the random access response message via a physical downlink shared channel (PDSCH).

In some cases, the UEs and the base stations may be in a low connectivity condition based on a link budget threshold between the UEs and the base stations. For example, the UEs and the base stations may communicate using higher frequency ranges (e.g., mmW frequency ranges such as FR2) such that transmissions may experience greater path losses. Further, the base stations may transmit the control information via PDCCH using a relatively wide beam width based on a quantity of synchronization signal blocks (SSBs) associated with the PDCCH transmission. Additionally, the UEs and the base stations may be in a low connectivity condition for a variety of other reasons, such as environmental factors (e.g., separation distance, signal obstruction, etc.). Such conditions may result in an increase in communication failures. For example, the UEs may be unable to successfully receive (e.g., decode) the control information transmitted by the base stations and, likewise, may be unable to receive the random access response message from the base stations. In such examples, the random access procedure may fail and the UEs and the base stations may not establish a connection.

In some examples, the described techniques may be used to configure the UEs to support repetition of control information, as well as a control channel, such as a PDCCH to improve reliability of various types of communication (e.g., control information, data) for the random access procedure. For example, the UEs may receive, from the base station, a configuration via radio resource control (RRC) signaling, or the like. The configuration may indicate a quantity of instances of control information associated with the random access response message of the random access response (e.g., a message 2 (or msg 2) or message B (or msg B)) and over the time window (e.g., a random access response window) associated with the random access procedure. The quantity of instances of the control information may include two or more repetitions of the same control information over two or more time and frequency resources (e.g., minislots, slots, subcarriers, carriers, and the like).

In some examples, the base stations may select, for the time window, a quantity of instances of the control information according to the configuration. The selected quantity of instances may be less than the configured quantity of instances in the time window. In some cases or at different time windows the base station may select the same quantity of instances as the configured quantity of instances. Additionally, the base stations may select another quantity of instances of the control information associated with random access responses for one or more other UEs. The described techniques may also be used to enable the UEs to monitor the time window for the control information of a random access response using one or more decoding hypotheses, which may relate to an assumption by the UEs of a quantity of instances of the control information the base stations have supplied. The UEs may thus receive and decode the random access response message associated with the control information (e.g., the control information and the random access response message may belong to the same random access response), based on the hypotheses, and complete the random access procedure accordingly.

For example, the UEs may identify a quantity of instances or any other information associated with the control information that may enable the UEs to determine which transmissions may be instances of the control information such that the UEs may know which transmissions to combine. In some examples, the UEs may combine multiple transmissions of the control information and may attempt to decode the combined transmissions. In some cases, combining multiple transmissions of the control information may increase the likelihood that the UEs will successfully decode the control information, and likewise may increase the chance that the UEs will receive the random access response message of the random access response (e.g., message 2 (or msg2) or message B (or msgB)).

Aspects of the subject matter described herein may be implemented to realize one or more advantages. The described techniques may support a more robust random access procedure based on increasing the likelihood that a UE may successfully receive control information associated with a random access response during a random access response window if experiencing low connectivity conditions. Further, a UE implementing the techniques of the present disclosure may achieve power savings by reducing the quantity of repeats of the random access procedure before successfully connecting to a base station. The device may identify a configuration indicating a quantity of instances of various types of communication (e.g., control information, data) for the random access procedure, and employ a soft combining technique to increase the likelihood that the UE may decode the various types of communication and identify a location to receive the random access response message (e.g., the PDSCH), thereby increasing the chance for a successful random access connection. As such, supported techniques may promote enhanced efficiency, for example in the context of high reliability and low latency operations in 4G or 5G systems, among other benefits.

Aspects of the disclosure are initially described in the context of wireless communications systems. Aspects of the disclosure are further illustrated by and described with reference to apparatus diagrams, system diagrams, and flowcharts that relate to flexible message repetition for random access procedures.

FIG. 1 illustrates an example of a wireless communications system 100 that supports flexible message repetition for random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
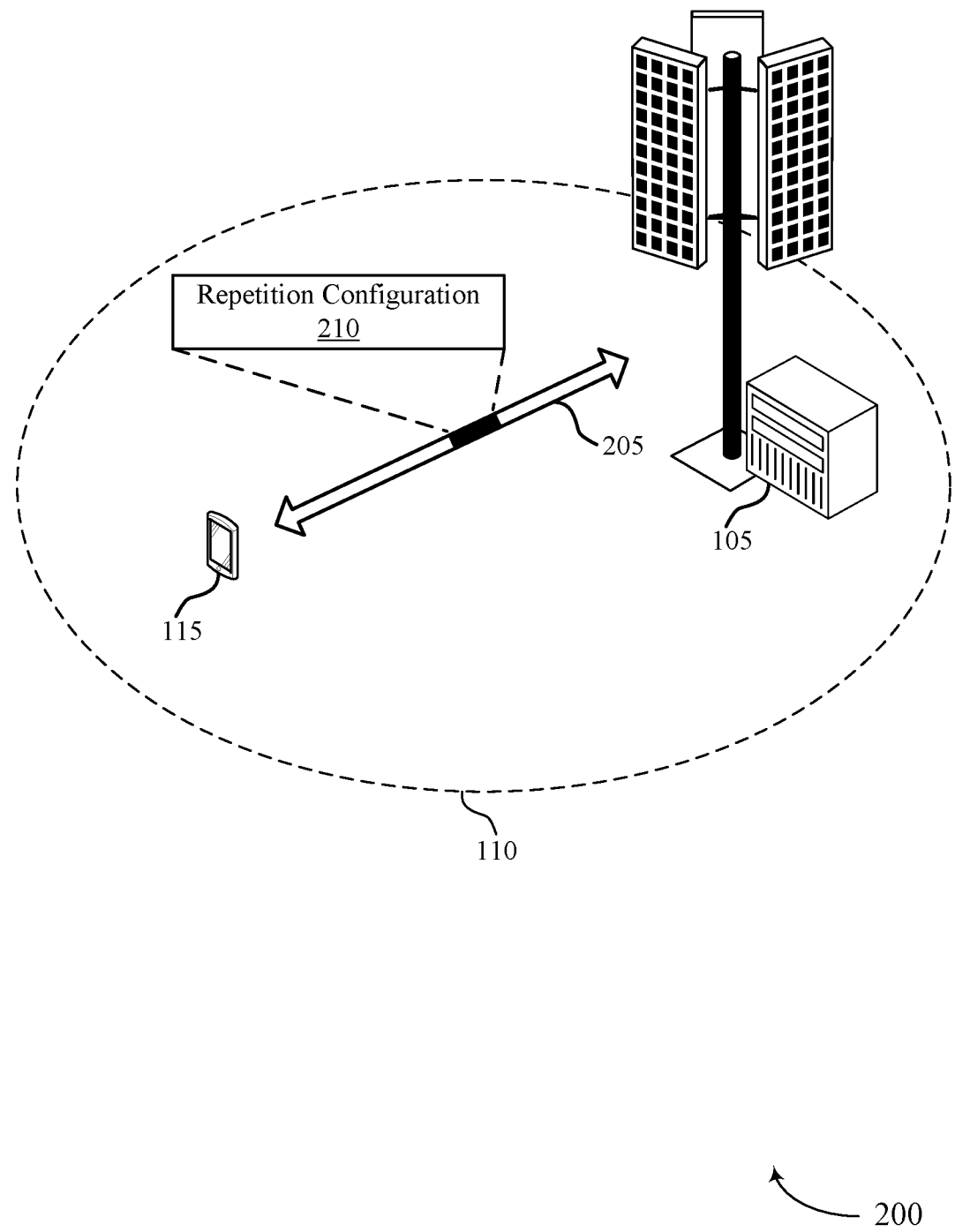

FIG. 2 illustrates an example of a wireless communications system 200 that supports flexible message repetition for random access procedures in accordance with aspects of the present disclosure. In some examples, the wireless communications system 200 may implement aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency random access operations, among other benefits.

In some cases, the UE 115 might not be connected to a serving base station (e.g., such as the base station 105), and may initiate a random access procedure to attempt to connect to the base station 105. The UE 115 may receive system information (e.g., via a system information block (SIB), such as SIB1 or SIB2) from the base station 105 via a broadcast message (e.g., via a physical broadcast channel (PBCH)) and may identify configuration information associated with the random access procedure based on the system information. For example, the base station 105 may broadcast information about resources or a power level that may be used by a connecting UE (e.g., the UE 115) during the random access procedure. Additionally, the base station 105 may broadcast, via the system information, a random access response window length that the connecting UE 115 may monitor for a random access response. In some cases, the base station 105 may indicate a random access response window length via an indicator in the system information.

The UE 115 may transmit a random access request to the base station 105 to initiate the random access procedure, which may include a physical random access channel (PRACH) preamble and a radio network temporary identifier (RNTI), such as a random access RNTI (RA-RNTI). The UE 115, using the random access request (e.g., msg1 or msgA including the PRACH) preamble, may indicate information to the base station 105 about its resource requirement. The base station 105 may receive the random access request from the UE 115 and may respond by transmitting a random access response. In some cases, the UE 115 may expect to receive the random access response within the random access response window indicated by the system information broadcast by the base station 105. During the random access response window, the base station 105 may transmit control information conveyed by a control channel (e.g., via the PDCCH of the random access response or msg2) that may indicate to the UE 115 the location (e.g., the time and frequency resources) of the random access response message conveyed by a data channel (e.g., via the PDSCH of the random access response or msg2).

In some cases, the base station 105 may transmit a quantity of single instances of the control information during a quantity of slots included in the random access response window length. The UE 115 may attempt to receive and decode each instance of the control information independently. For example, if the UE 115 is unable to receive and decode a first instance of the control information, the UE 115 may discard the unsuccessfully received or decoded control information and may attempt to receive and decode a second instance of the control information without storing any information associated with the first instance. This process may repeat for a monitoring occasion of each slot for the length of the random access response window until the UE 115 successfully receives and decodes a control information transmission or until the random access response window length expires.

Upon successful reception of the control information, the UE 115 may decode the control information and perform a parity check (e.g., a cyclic redundancy check) on the control information. Based on performing the parity check, the UE 115 may determine that the control information is relevant to a random access response from the base station 105. If the decoding and the parity check are successful and the random access response is decoded, the UE 115 may transmit a message 3 (e.g., an RRC connection request) of a four-step RACH procedure to the base station 105 and the random access procedure may advance (e.g., the random access procedure may advance to a next step).

In some cases, a communication link 205 between the UE 115 and the base station 105 may be associated with a link budget threshold (e.g., a link margin) based on the link characteristics of the communication link 205. For example, a path loss, a received signal strength, or other characteristics may influence the link budget threshold of the communication link 205. In the example of FIG. 2, the wireless communications system 200, may aim to more efficiently and reliably increase throughput, additional frequency ranges may be used by the UE 115 and the base station 105, which may enable them to achieve higher throughput. Higher frequency ranges (e.g., such as frequency ranges used in FR2, including mmW frequency ranges) may be implemented for wireless communications, in which transmitting at these higher frequencies involves transmitting at shorter wavelengths.

In some cases, the designations FR1 and FR2 may refer to frequency ranges that are available for communicating using the wireless communications system 200. For example, FR1 may refer to frequency range between about 450 MHz and about 7,125 MHz and FR2 may refer to a frequency range between about 24,250 MHz and about 52,600 MHz. Shorter wavelengths may be susceptible to greater path losses, which may adversely affect the link budget threshold (e.g., a link margin) of the communication link 205. Further, the base station 105 may employ a relatively wide transmit beam for transmissions to the UE 115. For example, the beam width of the transmit beam of the base station 105 may be based on (e.g., proportional to) the quantity of synchronization signal blocks (SSBs) associated with the transmissions of the base station 105. Based on receiving signals via a beam with a relatively wide beam width, the UE 115 may experience a lower received signal strength, which may also adversely affect the link budget threshold. In some cases, the link budget threshold may fall below a threshold value, which may result in an increase in communication failures over the communication link 205.

In some examples, the base station 105 may identify that the link budget threshold is below a threshold value and, accordingly, determine that the base station 105 is operating in a low connectivity condition with the UE 115. In such examples, the control information associated with the random access response from the base station 105 may have a lower likelihood of successful reception by the UE 115 (e.g., based on the low connectivity and poor link conditions). If the UE 115 cannot successfully decode the control information, the UE 115 may be unable to determine the location of the random access response message and therefore may be unable to transmit an RRC connection request, which may result in termination of the random access procedure as unsuccessful. The UE 115 may have to restart the random access procedure by, for example, retransmitting the random access request and monitoring a quantity of slots for the single instances of the control information.

In some examples, the UE 115 and the base station 105 may experience more successful random access procedures during low connectivity conditions by, for example, supporting flexible repetition of random access messages (e.g., msg1 or msg2) and combining (e.g., using soft combining) instances of control information associated with the random access messages. As described herein, the base station 105 may configure the UE 115 by, for example, transmitting a repetition configuration 210 over the communication link 205 using one or more directional beams (e.g., downlink directional beams). In some examples, the base station 105 may transmit the repetition configuration 210 on a downlink channel (e.g., a PDCCH) using the one or more directional beams.

The repetition configuration 210 may indicate a quantity of instances (also referred to as a set of repetitions) of control information or a control channel (e.g., a PDCCH) carrying the control information for a random access response window associated with the random access procedure. In some examples, the repetition configuration 210 may be a semi-static configuration. The base station 105 may provide the semi-static configuration to the UE 115 via RRC signaling. In other examples, the base station 105 may provide the repetition configuration 210 via downlink control signaling. In some examples, the base station 105 may transmit the repetition configuration 210 as part of a system information broadcast transmission (e.g., may be transmitted with a SIB or a master information block (MIB) via a PBCH, a broadcast control channel (BCCH), or a broadcast channel (BCH), or a combination thereof) that may be received by a UE 115. Accordingly, the UE 115 may attempt to connect to the base station 105 using a random access procedure and may know to use the repetition configuration 210 indicated by the base station 105.

In some examples, the base station 105 may configure a random access response window to support combining multiple repetitions of the control information associated with the random access response. In some examples, the UE 115 may monitor a quantity of slots for control information transmissions associated with the random access response based on the repetition configuration 210. The UE 115 may, in some examples, monitor the quantity of slots for control information using one or more hypotheses, which may relate to an assumption by the UE 115 of a quantity of repetitions of the control information the base station 105 has applied. The UE 115 may thus receive and decode the random access response for the control information, based on the hypotheses, and complete the random access procedure accordingly.

The UE 115 may receive, from the base station 105, signaling indicating the repetition configuration 210 for the random access response window for communicating to the UE 115 the random access response of the random access procedure. The repetition configuration 210 may indicate a first quantity of instances of control information, and at least a portion of the time window configured for transmitting a first quantity of instances of the control information associated with the random access response in multiple slots. The UE 115 may identify the first quantity of instances of the control information for the random access response message in the first subset of slots of the multiple slots. The first quantity of instances of the control information may correspond to a maximum repetition value of the control information. In some other examples, the UE 115 may receive, from the base station 105, an indication of quantity of instances of the control information for the random access response message in the first subset of slots of the multiple slots.

The quantity of instances of the control information may correspond to a repetition of the control information over the first subset of slots. In some examples, the quantity of instances of the control information for the random access response message in the first subset of slots may be less than a threshold quantity of instances of the control information for the random access response message in the first subset of slots. Additionally or alternatively, in some examples, the quantity of instances of the control information associated with the random access response in the first subset of slots may be based on the received indication and an aggregation level for the control channel carrying the control information. The UE 115 may thus monitor, during the time window and according to the repetition configuration 210, the multiple slots for instances of the control information.

In some examples, the UE 115 may receive a second quantity of instances of the control information for the UE 115 in the first subset of slots of the multiple slots. The second number may be less than the first quantity of instances. In some examples, a second subset of slots of the multiple slots may include control information associated with random access responses for one or more other UEs. The UE 115 may, in some examples, combine the instances of the control information from the first subset of slots, and decode the random access response received as part of the random access procedure based on combining the instances. For example, the UE 115 may attempt to decode the control information by combining signals received on a plurality of different subsets of slots of the plurality of slots, the plurality of may be different subsets of slots including the first subset of slots and the second subset of slots. The UE 115 may also combine the instances of the control information from both the first subset of slots and the second subset of slots to decode the random access response message. Thus, based on the repetition configuration 210, the UE 115 may identify a quantity of control information instances that may be stored and combined with other control information instances. The UE 115 may effectively increase the received signal strength of the control information transmissions by combining repetitions of the transmissions together, thereby increasing the likelihood that the UE 115 may successfully decode the control information.

Figure 3:
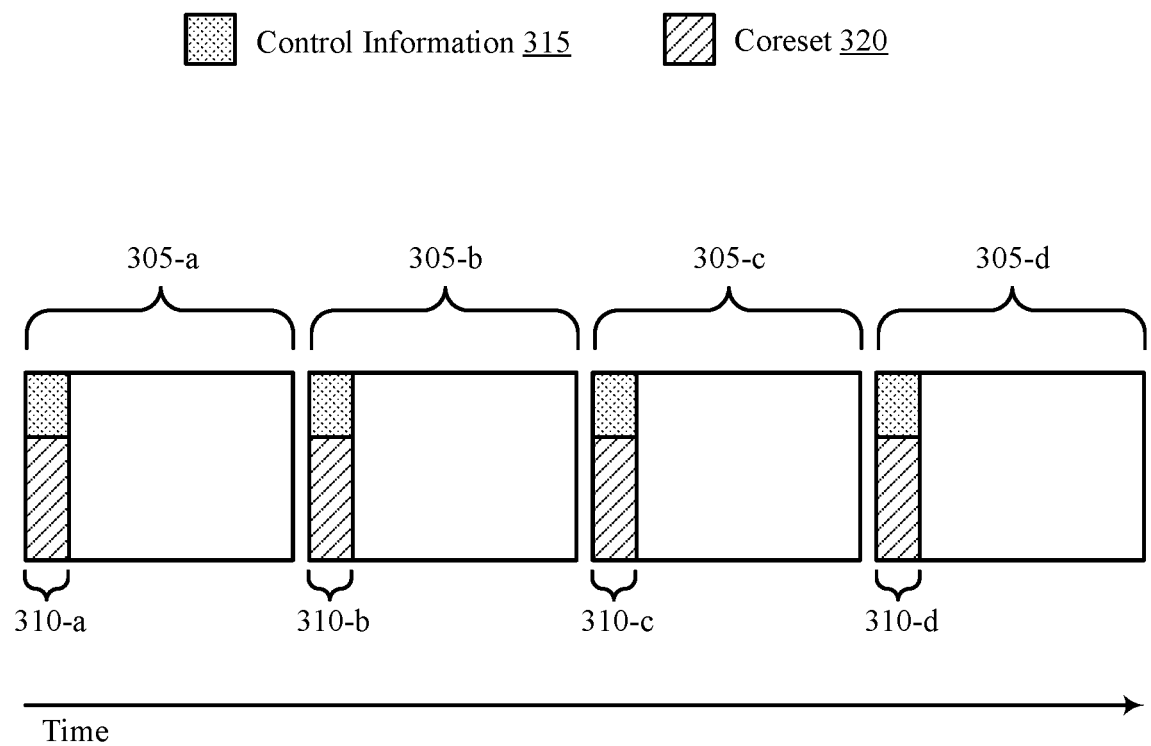
FIG. 3 illustrates an example of a repetition schedule that supports flexible message repetition for random access procedures in accordance with aspects of the present disclosure.

FIG. 3 illustrates an example of a repetition schedule 300 that supports flexible message repetition for random access procedures in accordance with aspects of the present disclosure. The repetition schedule 300 may implement aspects of the wireless communications systems 100 and 200 described with reference to FIGS. 1 and 2, respectively. For example, the repetition schedule 300 may be based on a configuration by a base station 105 or a UE 115, and implemented by the UE 115. In the example illustrated in FIG. 3, the repetition schedule 300 may be applicable to implementations or instances in which the UE 115 is configured with flexible message repetition for a random access procedure, such as a 4-step RACH procedure or 2-step RACH procedure. The repetition schedule 300 may thus provide increased flexibility for control information and improvements to the reliability of random access messaging in 5G systems, among other benefits. For example, the repetition schedule 300 may illustrate how a base station 105 may transmit a quantity of instances of control information associated with a random access response in a quantity of consecutive slots. Based on using the repetition schedule 300, a UE 115 may be more likely to connect to the base station 105 using a random access procedure during a low connectivity condition.

The repetition schedule 300 may include a quantity of slots, such as slot 305-a, slot 305-b, slot 305-c, and slot 305-d. A control resource set (coreset) 320 may be inside each slot, and an instance of a control information 315 may be included inside each coreset 320. In some examples, each instance of the control information 315 may be in the same location in each of the quantity of slots 305. For example, the base station 105 may transmit all instances of control information 315 associated with a same random access response such that the UE 115 may receive the control information at monitoring occasions 310-a, 310-b, 310-c, and 310-d (e.g., at a same location in each consecutive slot).

Additionally or alternatively, each instance of the control information 315 may be associated with a same repetition level, and the UE 115 may identify the repetition level of each instance of the control information 315 to identify which instances of control information 315 may be linked (e.g., combined). For example, each instance of the control information 315 may include a same quantity of CCEs. Additionally or alternatively, each instance of the control information 315 may be associated with an index that the UE 115 may use to link (e.g., combine) a quantity of instances of the control information 315. In some cases, one or more instances of the control information 315 may be in different locations in each of the quantity of slots 305.

In some cases, with reference to FIGS. 2 and 3, the base station 105 may select a smaller quantity of repetitions without informing the UE 115. The UE 115 may thus monitor a control channel (e.g., a PDCCH) over the quantity of slots, such as the slot 305-a, the slot 305-b, the slot 305-c, and the slot 305-d based on a repetition hypothesis, which may relate to an assumption by the UE 115 of a quantity of repetitions of the control information 315 the base station 105 has applied. For example, the UE 115 may expect four repetitions on the slot 305-a, the slot 305-b, the slot 305-c, and the slot 305-d. However, the base station 105 may only transmit two repetitions for the UE 115 on the slots 305-c and the slot 305-d, and may transmit control information using control channel candidates (e.g., PDCCH candidates) on the slot 305-a and the slot 305-b for other UEs.

In this case, the UE 115 may monitor the control channel (e.g., PDCCH) by, for example, soft combining control information corresponding to control channel candidates in all the quantity of slots, such as the slot 305-a, the slot 305-b, the slot 305-c, and the slot 305-d. The UE 115 may then try to decode the control information 315 and perform a parity check on the control information 315. In some examples, the interference level from the control channel intended for the other UEs (e.g., on the slot 305-a and the slot 305-b) may be equal to a power of the signal (e.g., 0 dB interference). Therefore, a signal-to-interference-plus-noise ratio (SINR) level may still be better than a required SINR for detection of the PDCCH (e.g., with a large aggregation level).

As such, an actual quantity of repetitions may be a subset of positive integer numbers smaller or equal to a nominal repetition number (e.g., a preconfigured repetition number). For example, in case of a nominal repetition of four, the actual quantity of repetitions may be a subset (e.g., {2,4}) based on a specification. The subset of valid numbers for the actual quantity of repetitions may be dependent on both the nominal quantity of repetitions and an aggregation level of the control channel. For example, a subset of valid numbers of actual repetitions may be a first subset (e.g., {2,4}) for one aggregation level (e.g., aggregation level 4), and a second subset (e.g., {1, 2, 4}) for a second aggregation level (e.g., aggregation level 8).

Figure 4:
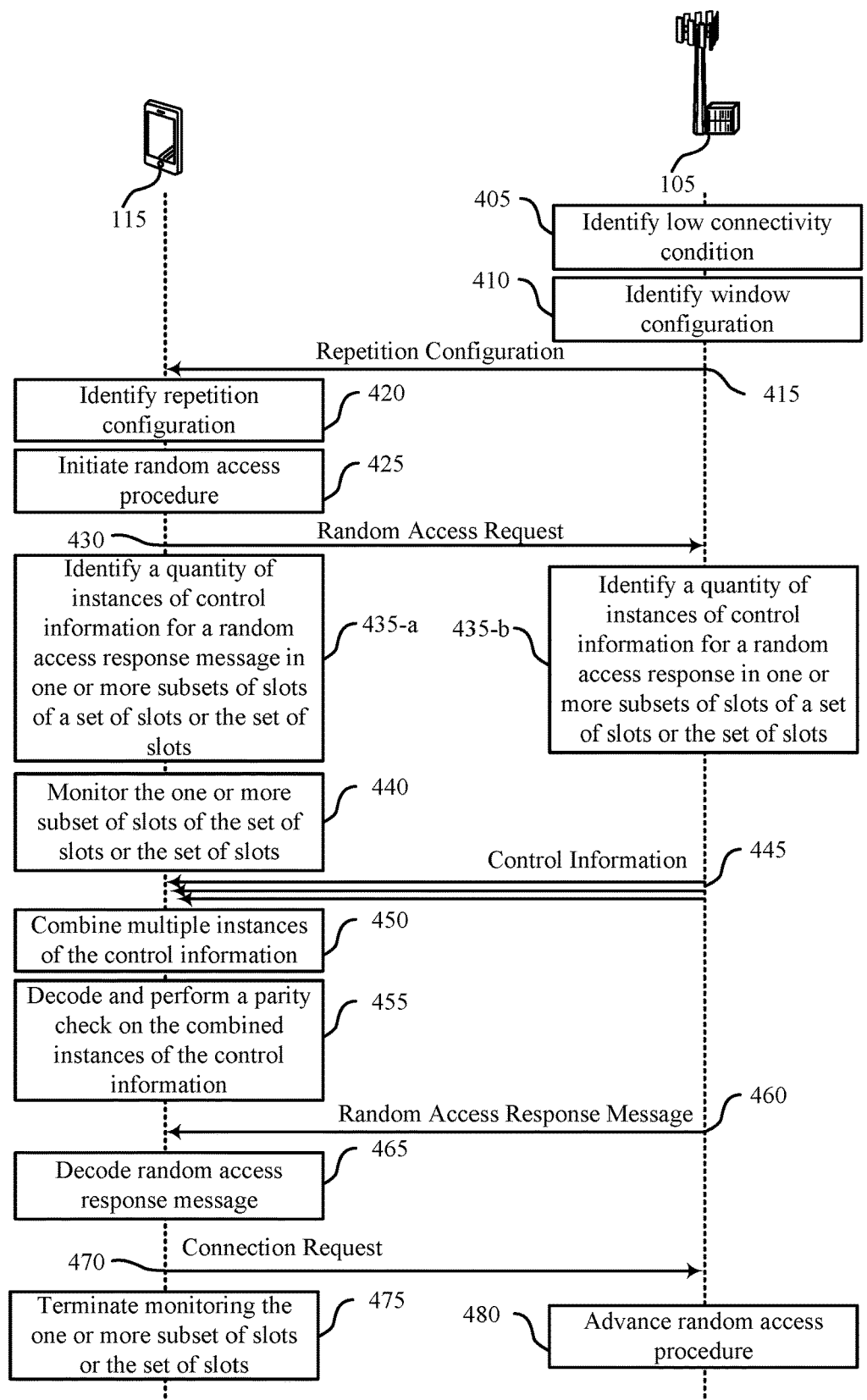
FIG. 4 illustrates an example of a process flow that supports flexible message repetition for random access procedures in accordance with aspects of the present disclosure.

FIG. 4 illustrates an example of a process flow 400 that supports flexible message repetition for random access procedures in accordance with aspects of the present disclosure. The process flow 400 may implement aspects of the wireless communications system 100 and 200 described with reference to FIGS. 1 and 2, respectively. For example, the process flow 400 may be based on a configuration by a base station 105 or a UE 115, and implemented by the UE 115, for reduced power consumption, decreased random access message decoding, improved random access operations, and may promote low latency for wireless communications, among other benefits. The base station 105 and the UE 115 may be examples of a base station 105 and a UE 115, as described with reference to FIGS. 1 and 2. In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400.

At 405, the base station 105 may identify that the base station 105 is operating in a lower connectivity condition. For example, the base station 105 may identify that a link budget threshold of a communication link between the UE 115 and the base station 105 (e.g., the communication link 205 described with reference to FIG. 2) is less than a threshold value, which may be associated with an increase in communication failures between the UE 115 and the base station 105. In some examples, the link budget threshold may fall below the threshold value based on a frequency range (e.g., and resulting path losses) of the transmissions between the UE 115 and the base station 105 (e.g., the UE 115 and the base station 105 may employ relatively high frequency ranges, such as mmW frequency ranges used in FR2) or based on a beam width of the transmitting device (e.g., the base station 105 may employ a relatively wide beam width, potentially resulting in a lower received signal strength at the UE 115).

Additionally, the base station 105 may identify that the base station 105 is operating in the low connectivity condition based on a quantity of previous communication failures resulting from a variety of additional factors that may influence the link budget threshold (e.g., link obstruction by an object, separation distance, and other environmental factors). In cases when the base station 105 identifies that a low connectivity condition applies, the base station 105 may determine or predict that a random access procedure between the UE 115 and the base station 105 may be unsuccessful. For example, based on identifying a low connectivity condition applies to current operations, the base station 105 may determine or predict that single instances of control information transmissions during a random access response window may be received by the UE 115 with an insufficient signal quality (e.g., a low SNR, a low received signal strength, etc.) such that the UE 115 may be unable to successfully receive and decode individual instances of the control information. Accordingly, the base station 105 may determine that the UE 115 will be unable to identify the location of the random access response message and unable to advance the random access procedure.

At 410, the base station 105 may identify a repetition configuration for a random access response window for communicating a random access response as part of a random access procedure. In some examples, the base station 105 may identify the repetition configuration based on identifying that the base station 105 is operating in a low connectivity condition. For example, the base station 105 may identify a repetition configuration such that the UE 115 may experience a greater likelihood to successfully receive control information associated with the random access response, and accordingly may be more likely to receive the random access response message and advance the random access procedure. In some cases, the UE 115 may more successfully receive and decode instances of control information based on employing a combining technique (e.g., soft combining) that combines two or more instances of control information together prior to decoding. Accordingly, in some examples, the base station 105 may identify a repetition configuration that indicates a first quantity of instances of control information associated with the random access response in a plurality of slots, and at least a portion of the random access response window configured for transmitting the first quantity of instances. The UE 115 may use combining techniques to decode the first quantity of instances of the control information.

Once the base station 105 identifies the repetition configuration, the base station 105 may transmit the repetition configuration, at 415, to inform the UE 115 of the repetition configuration so that the UE 115 and the base station 105 may operate coherently (e.g., so that the UE 115 knows when and how it may combine instances of control information). The repetition configuration 415 may convey the first quantity of instances of control information, and at least the portion of the access response window configured for transmitting the first quantity of instances of the control information associated with the random access response in the plurality of slots during the random access procedure. In some examples, the base station 105 may transmit the repetition configuration via system information. Additionally or alternatively, the base station 105 may signal the repetition configuration in a MIB via a broadcast transmission (e.g., via PBCH). Accordingly, the UE 115 may receive the repetition configuration from the base station 105.

At 420, the UE 115 may identify the repetition configuration for communicating (e.g., receiving) the random access response as part of a random access procedure. Based on receiving the repetition configuration at 415, the UE 115 may, at 425, initiate the random access procedure and, at 430, the UE 115 may transmit a random access request to the base station 105. For example, the UE 115 may be an unserved UE 115 or may be switching from another base station 105 and may attempt to connect to the base station 105 using a random access procedure. The UE 115 may use a contention-based random access procedure or a contention-free random access procedure. In some cases, the UE 115 may transmit the random access request to the base station 105 as part of a random access preamble. The random access request may include a preamble identification (ID) and an RA-RNTI. In some examples, the UE 115 may use the random access request to initiate the random access procedure and to provide an indication to the base station 105 about the resource requirement of the UE 115. Upon transmission of the random access request, the UE 115 may expect to receive a random access response during a random access response window (e.g., according to the repetition configuration identified at 420).

At 435-*a*, the UE 115 may identify a quantity of instances of control information for the random access response message in a set of slots or in one or more subsets thereof. For example, the UE 115 may identify a first quantity of instances of the control information for the random access response message in a first subset of the set of slots. The first quantity of instances of the control information may correspond to a maximum repetition value of the control information. Alternatively, the UE 115 may optionally receive, from the base station 105, an indication of the quantity of instance of the control information for the random access response message in the first subset of slots of the plurality of slots. The quantity of instances of the control information may correspond to a repetition of the control information over the first subset of slots of the plurality of slots. In some cases, the quantity of instances of the control information for the random access response message in the first subset of slots may be less than a threshold quantity of instances of the control information for the random access response message in the first subset of slots. Similarly, at 435-*b*, the base station 105 may identify a quantity of instances of control information for a random access response message in the set of slots or one or more subsets thereof. For example, the base station 105 may identify the first quantity of instances of the control information for the random access response message in the first subset of the set of slots.

At 440, based on identifying the quantity of instances of the control information, the UE 115 may monitor the sets of slots or one or more subsets thereof for the quantity of instances of the control information. At 445, the base station 105 may transmit a quantity of instances of the control information in the set of slots or one or more subsets thereof. For example, the base station 105 may transmit the first quantity of instances of the control information for the random access response message in the first subset of the set of slots. Alternatively, the base station 105 may transmit a second quantity of instances of the control information for the UE 115 in the first subset of the plurality of slots. The second quantity of instances may be less than the first quantity of instances. In some examples, the second quantity of instances of the control information associated with the random access response in the first subset of slots may be based part on receiving the indication and an aggregation level for a control channel carrying the control information. Additionally, in some examples, the base station 105 may transmit, in a second subset of the set of slots, a third quantity of instances of other control information associated with the random access responses for one or more other UEs.

The one or more subsets of slots of the set of slots or the set of slots may be consecutive in some cases. In some examples, according to the repetition configuration, the base station 105 may transmit each repeating instance of the control information in the same location of each of the quantity of consecutive slots (e.g., at the beginning of each slot). Additionally or alternatively, the base station 105 may link the repeating instances of the control information via a repetition level. For example, the base station 105 may transmit each instance of the repeating instances of the control information in a same location within a slot or each instance may feature the same repetition level, such that each instance of the control information may have the same quantity of CCEs included in the control information.

The UE 115 may attempt to receive and decode the repeatedly transmitted instances of the control information. In some cases, the base station 105 may transmit repeating instances of the control information and the UE 115 may monitor for repeating control information instances (e.g., instances of the control information that are linked according to the repetition configuration). In some examples, the UE 115 may identify a quantity of control information instances while monitoring the set of slots or one or more subsets thereof, and store the quantity of control information instances while monitoring for additional instances. The instances of the control information received by the UE 115 and used for combining may be similar or identical copies of the instances transmitted by the base station 105. The copies of the instances received by the UE 115 may have slight differences due to disturbances that occur during communication of the signals that carry the copies of the instances.

At 450, the UE 115 may combine multiple instances of the control information. For example, the UE 115 may combine the instances of the control information from the first subsets of slots. In some examples, the UE 115 may combine the instances of the control information from both the first subset of slots and the second subset of slots. In some examples, the UE 115 may combine the quantity of control information instances identified from monitoring (e.g., using soft-combining). Based on combining the multiple instances of the control information, the UE 115 may effectively increase the received signal strength of the control information transmissions from the base station 105. For example, the UE 115 may receive a quantity of partial, incomplete, or partially erroneous control information instances and, after combining, may construct a complete or near-complete control information signal.

At 455, the UE 115 may decode and perform a parity check on the combined instances of the control information. In some examples, the UE 115 may successfully decode the combined control information instances based on constructing a complete or near-complete control information signal from a quantity of control information instances. Additionally, the UE 115 may perform a parity check on the control information generated from combining the control information instances. In some cases, decoding the control information occurs after performing the parity check. The UE 115 may detect any errors in the control information generated by combining the quantity of instances, and based on successfully performing the parity check the UE 115 may identify the location (e.g., time and frequency resources) for a random access response message corresponding to the random access request transmitted by the UE 115 at 430.

At 460, the base station 105 may transmit a random access response message to the UE 115, and at, 465, the UE 115 may decode the random access response message. For example, the UE 115 may decode the random access response message based on the combined instances of the control information. In some cases, the UE 115 may decode the random access response message and identify an uplink resource allocation (e.g., an uplink grant) for transmitting a message 3 (e.g., an RRC connection request) using a PUSCH. At 470, the UE 115 may transmit a connection request (e.g., the RRC connection request) to the base station 105. Based on transmitting the connection request, the UE 115 may terminate monitoring the set of slots or one or more subsets thereof in the random access response window at 475 and the base station 105 may advance the random access procedure at 480. In this manner, the UE 115 operating in a high connectivity condition (e.g., featuring a communication link with a link budget threshold that is greater than the threshold value) may refrain from monitoring more slots than may be necessary for the UE 115 to establish a connection with the base station 105.

Figure 5:
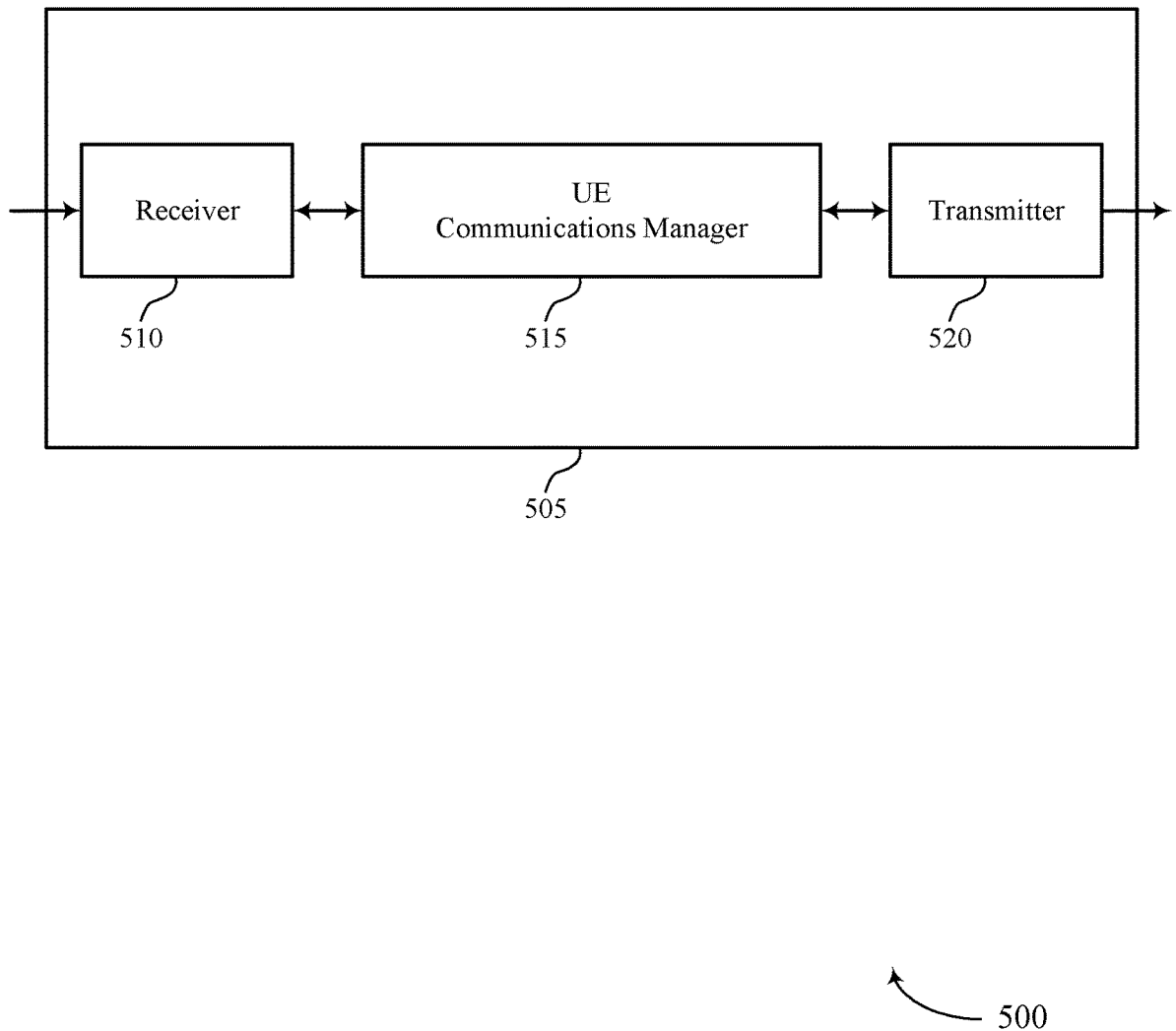
FIGS. 5 and 6 show block diagrams of devices that support flexible message repetition for random access procedures in accordance with aspects of the present disclosure.

FIG. 5 shows a block diagram 500 of a device 505 that supports flexible message repetition for random access procedures in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to flexible message repetition for random access procedures, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances, monitor, during the time window according to the configuration, the set of slots for instances of the control information, receive a second quantity of instances of the control information for the UE in a first subset of slots of the set of slots, the second quantity of instances less than the first quantity of instances, and a second subset of slots of the set of slots including a third quantity of instances of other control information associated with random access responses for one or more other UEs, combine the instances of the control information from the first subset of slots, and decode the random access response received as part of the random access procedure based on combining the instances. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset of a mobile device modem, and the receiver 510 and transmitter 520 may be implemented as analog components (e.g., amplifiers, filters, antennas) coupled with the mobile device modem to enable wireless transmission and reception over one or more bands.

The communications manage 515 may be implemented to realize one or more potential advantages. One implementation may allow the device 505 to receive a configuration indicating a quantity of instances of control information associated with a random access response message. Based on the techniques for receiving the configuration, the device 505 may support successfully receiving control information if experiencing low connectivity conditions. Accordingly, the UE may exhibit a reduced power consumption, an enhanced efficiency, an increased reliability, or a reduced latency, among other benefits.

Figure 6:
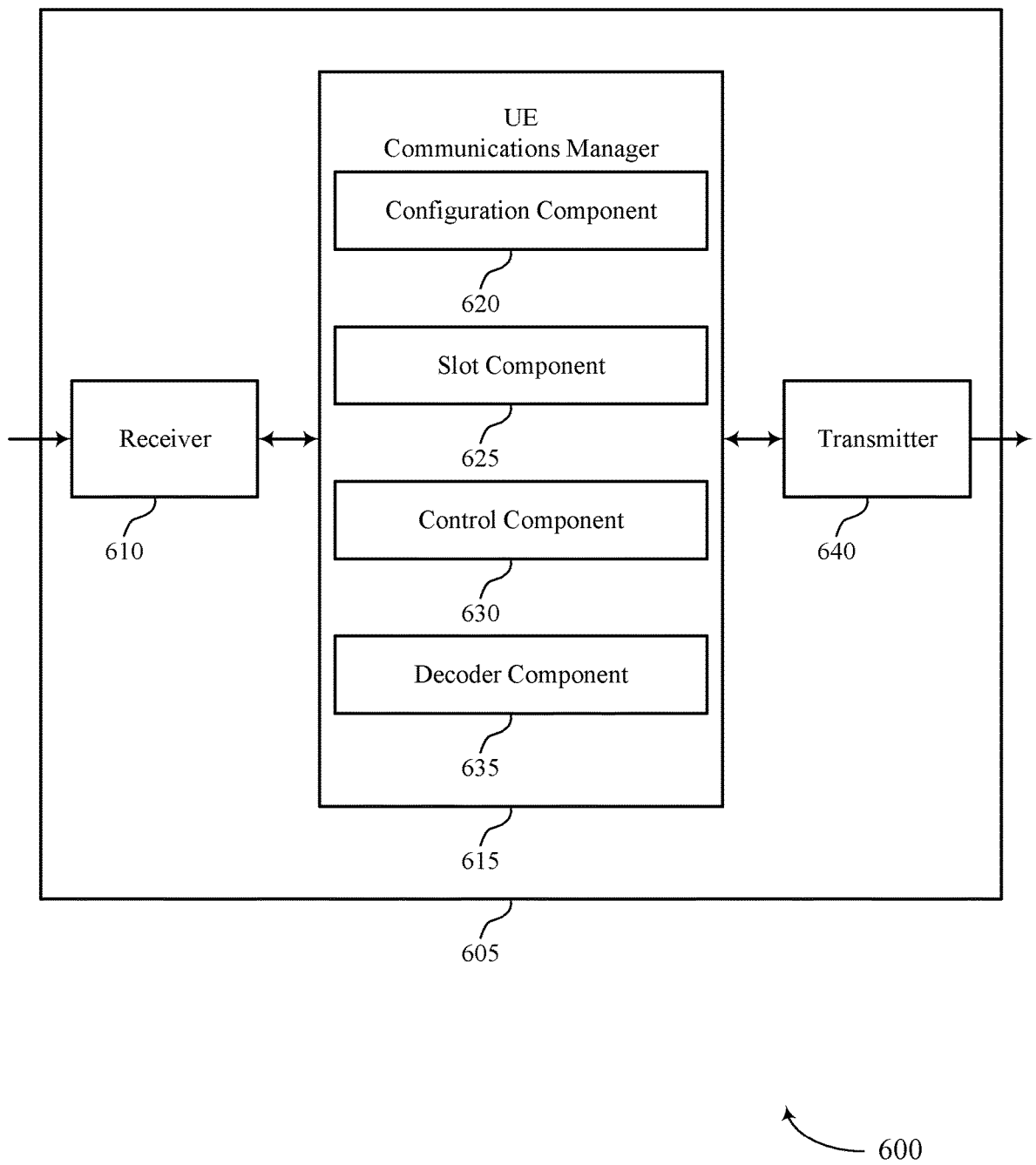

FIG. 6 shows a block diagram 600 of a device 605 that supports flexible message repetition for random access procedures in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to flexible message repetition for random access procedures, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a configuration component 620, a slot component 625, a control component 630, and a decoder component 635. The UE communications manager 615 may be an example of aspects of the UE communications manager 810 described herein.

The configuration component 620 may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances. The slot component 625 may monitor, during the time window according to the configuration, the set of slots for instances of the control information. The control component 630 may receive a second quantity of instances of the control information for the UE in a first subset of slots of the set of slots, the second quantity of instances less than the first quantity of instances, and a second subset of slots of the set of slots including a third quantity of instances of other control information associated with random access responses for one or more other UEs and combine the instances of the control information from the first subset of slots. The decoder component 635 may decode the random access response received as part of the random access procedure based on combining the instances.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
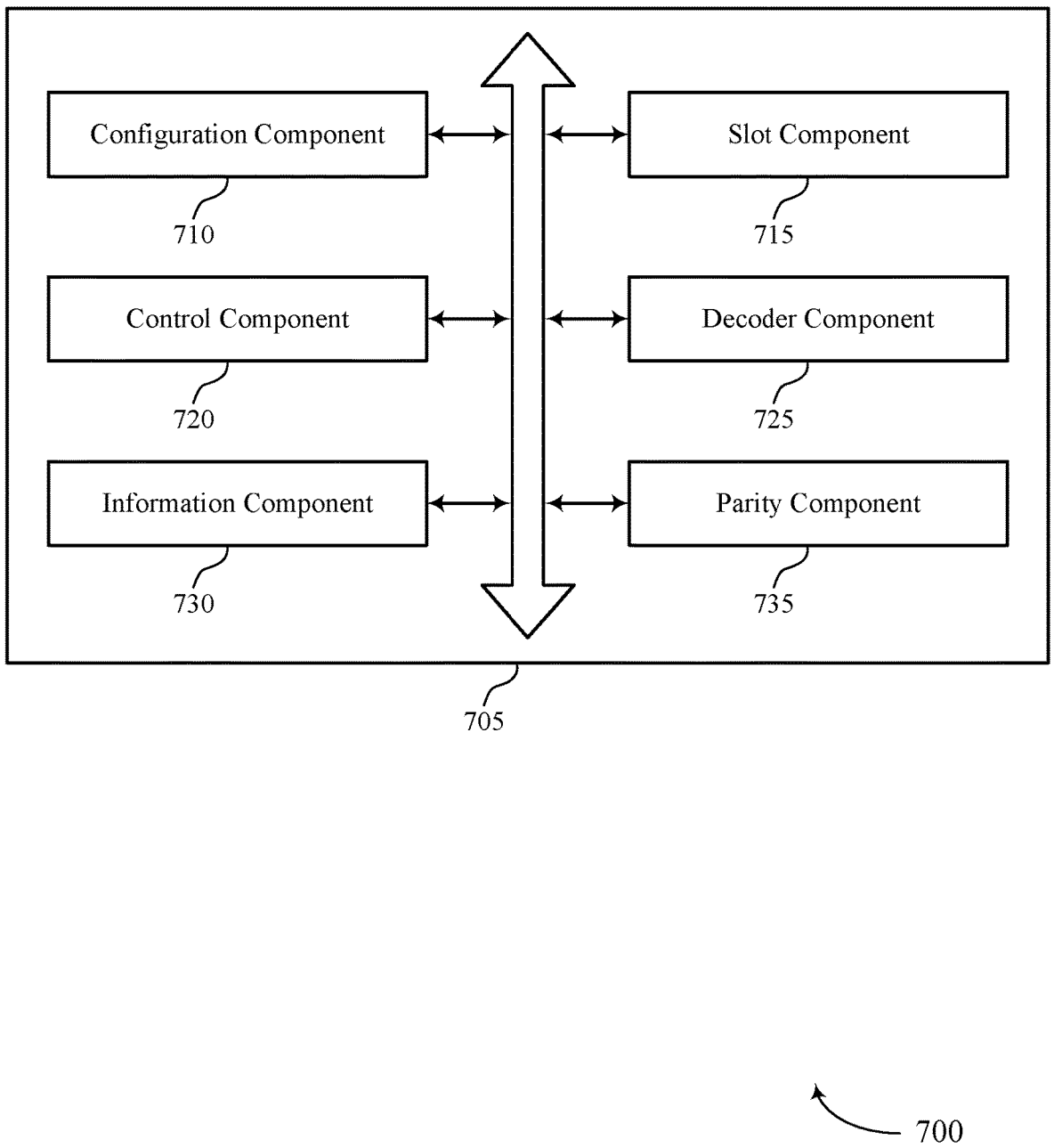
FIG. 7 shows a block diagram of a user equipment (UE) communications manager that supports flexible message repetition for random access procedures in accordance with aspects of the present disclosure.

FIG. 7 shows a block diagram 700 of a UE communications manager 705 that supports flexible message repetition for random access procedures in accordance with aspects of the present disclosure. The UE communications manager 705 may be an example of aspects of a UE communications manager 515, a UE communications manager 615, or a UE communications manager 810 described herein. The UE communications manager 705 may include a configuration component 710, a slot component 715, a control component 720, a decoder component 725, an information component 730, and a parity component 735. Each of these components may communicate, directly or indirectly, with one another (e.g., via one or more buses).

The configuration component 710 may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances. In some examples, the configuration component 710 may identify, based at last in part on the configuration, the first quantity of instances of the control information for the random access response in the first subset of slots of the set of slots, where the monitoring the set of slots for the instances of the control information for the UE is based on the first quantity of instances. In some cases, the first quantity of instances of the control information corresponds to a maximum repetition value of the control information.

The slot component 715 may monitor, during the time window according to the configuration, the set of slots for instances of the control information. In some examples, the slot component 715 may monitor the first subset of slots of the set of slots based on receiving the indication of the quantity of instances of the control information. In some cases, the quantity of instances of the control information correspond to a repetition of the control information over the first subset of slots of the set of slots. In some cases, the quantity of instances of the control information for the random access response in the first subset of slots is less than a threshold quantity of instances of the control information for the random access response in the first subset of slots. In some cases, the second quantity of instances of the control information associated with the random access response in the first subset of slots is based on receiving the indication and an aggregation level for a control channel carrying the control information.

In some cases, the first subset of slots are consecutive slots of the set of slots. In some cases, the second subset of slots are consecutive slots of the set of slots. In some cases, the first subset of slots are consecutive with the second subset of slots. In some cases, at least two slots the first subset of slots are non-consecutive slots of the set of slots.

In some cases, a sum of the second quantity of instances of the control information and the third quantity of instances of the other control information is equal to the first quantity of instances of the control information.

The control component 720 may receive a second quantity of instances of the control information for the UE in a first subset of slots of the set of slots, the second quantity of instances less than the first quantity of instances, and a second subset of slots of the set of slots including a third quantity of instances of the other control information associated with random access responses for one or more other UEs. In some examples, the control component 720 may combine the instances of the control information from the first subset of slots. In some examples, the control component 720 may combine the instances of the control information from both the first subset of slots and the second subset of slots, where the decoding the random access response is based on the combining the instances of the control information from both the first subset of slots and the second subset of slots. In some examples, the control component 720 may receive, from the base station, an indication of a quantity of instances of the control information for the random access response in the first subset of slots of the set of slots. In some cases, the instances of the control information are carried on a control channel. In some cases, the control channel includes a physical downlink control channel.

The decoder component 725 may decode the random access response received as part of the random access procedure based on combining the instances. In some examples, the decoder component 725 may attempt to decode the control information by combining signals received on a set of different subsets of slots of the set of slots, the set of different subsets of slots including the first subset of slots and the second subset of slots. The information component 730 may receive system information including an indicator of the configuration for the time window. In some cases, the system information includes a RMSI, a SIB, or a MIB, or any combination thereof. The parity component 735 may perform a parity check on the combination of the instances of the random access response, where decoding the random access response is based on performing the parity check. In some cases, the parity check includes a cyclic redundancy check.

Figure 8:
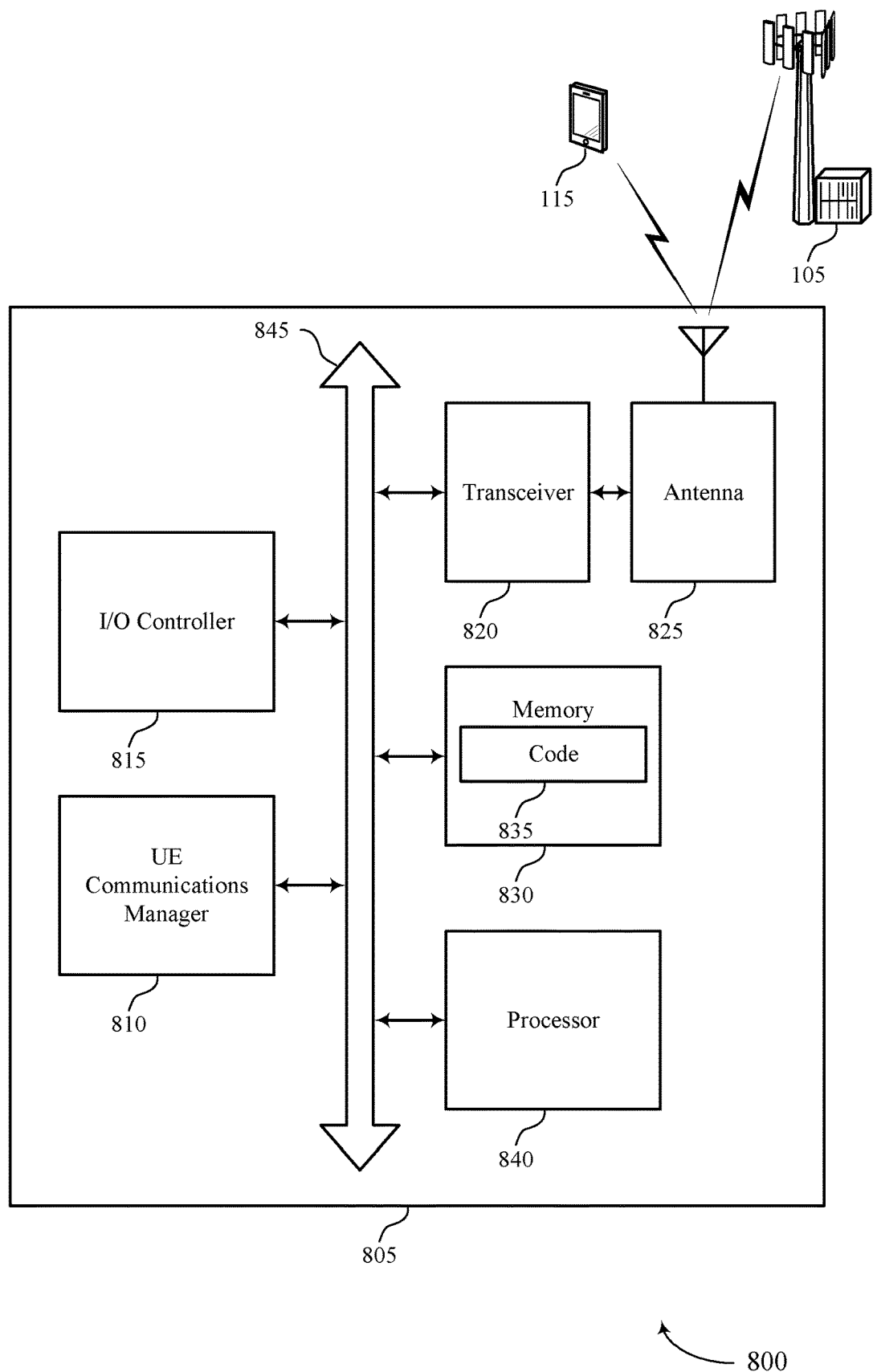
FIG. 8 shows a diagram of a system including a device that supports flexible message repetition for random access procedures in accordance with aspects of the present disclosure.

FIG. 8 shows a diagram of a system 800 including a device 805 that supports flexible message repetition for random access procedures in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances, monitor, during the time window according to the configuration, the set of slots for instances of the control information, receive a second quantity of instances of the control information for the UE in a first subset of slots of the set of slots, the second quantity of instances less than the first quantity of instances, and a second subset of slots of the set of slots including a third quantity of instances of the other control information associated with random access responses for one or more other UEs, combine the instances of the control information from the first subset of slots, and decode the random access response received as part of the random access procedure based on combining the instances.

The UE communications manager 810 may as described herein be implemented to realize one or more potential advantages. One implementation may allow the device 805 to save power and increase battery life by communicating with a base station 105 (as shown in FIGS. 1 through 3) more efficiently. For example, the device 805 may reduce retransmissions of control information associated with random access messaging by supporting flexible message repetition for a random access procedure. In addition, the device 805 may experience reduced complexity, better throughput through faster decoding operations of the control information by supporting soft combining of the control information. Another implementation may promote higher reliability and lower latency communications at the device 805 due to random access messaging flexibility of the device 805, as a result of supporting combined control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting flexible message repetition for random access procedures).

Figure 9:
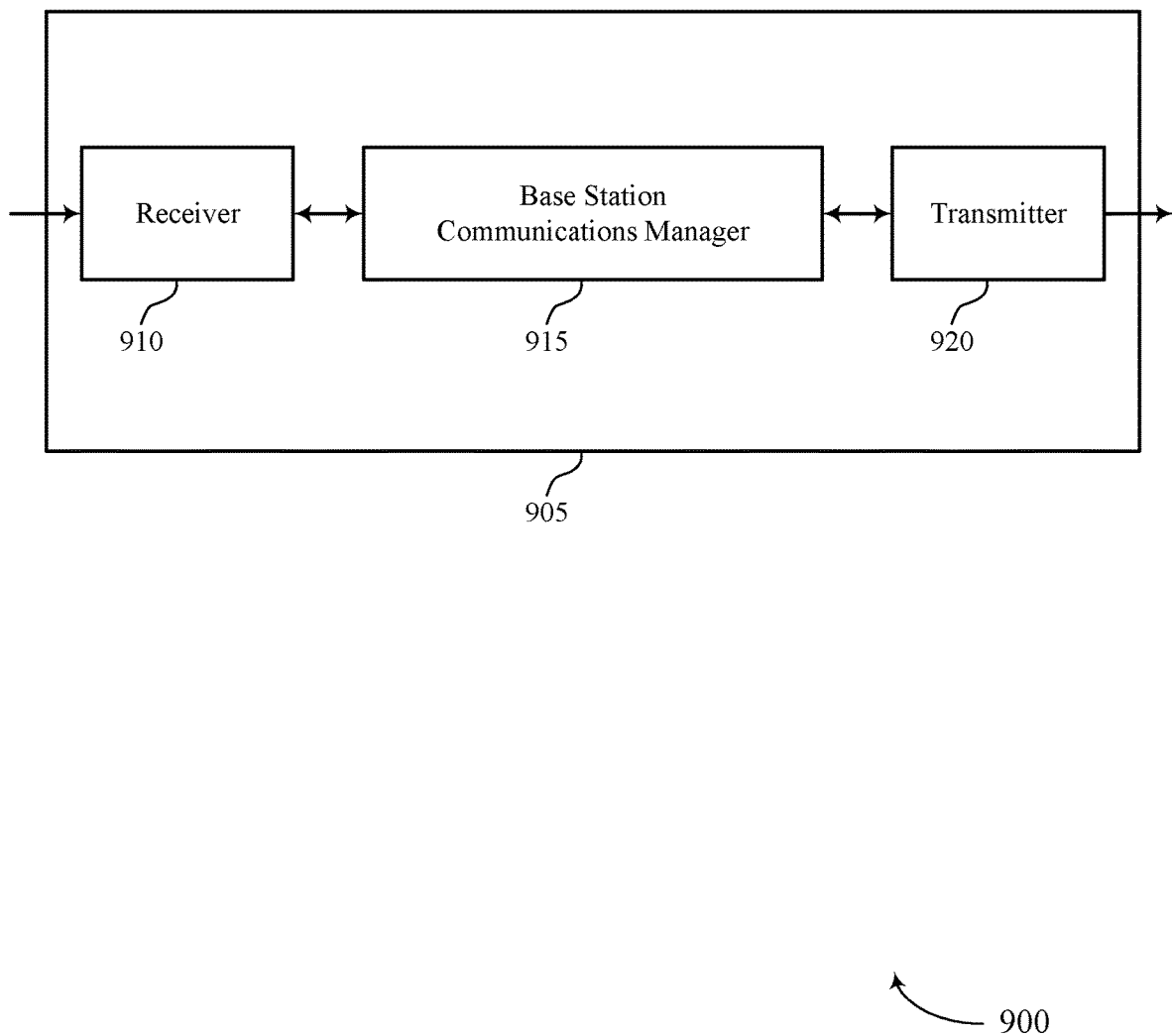
FIGS. 9 and 10 show block diagrams of devices that support flexible message repetition for random access procedures in accordance with aspects of the present disclosure.

FIG. 9 shows a block diagram 900 of a device 905 that supports flexible message repetition for random access procedures in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to flexible message repetition for random access procedures, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances, receive, from the UE, a random access request of the random access procedure, select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs, and transmit the second quantity of instances of the control information for the UE in the first subset of slots and the third quantity of instances of the other control information for the one or more other UEs in the second subset of slots. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
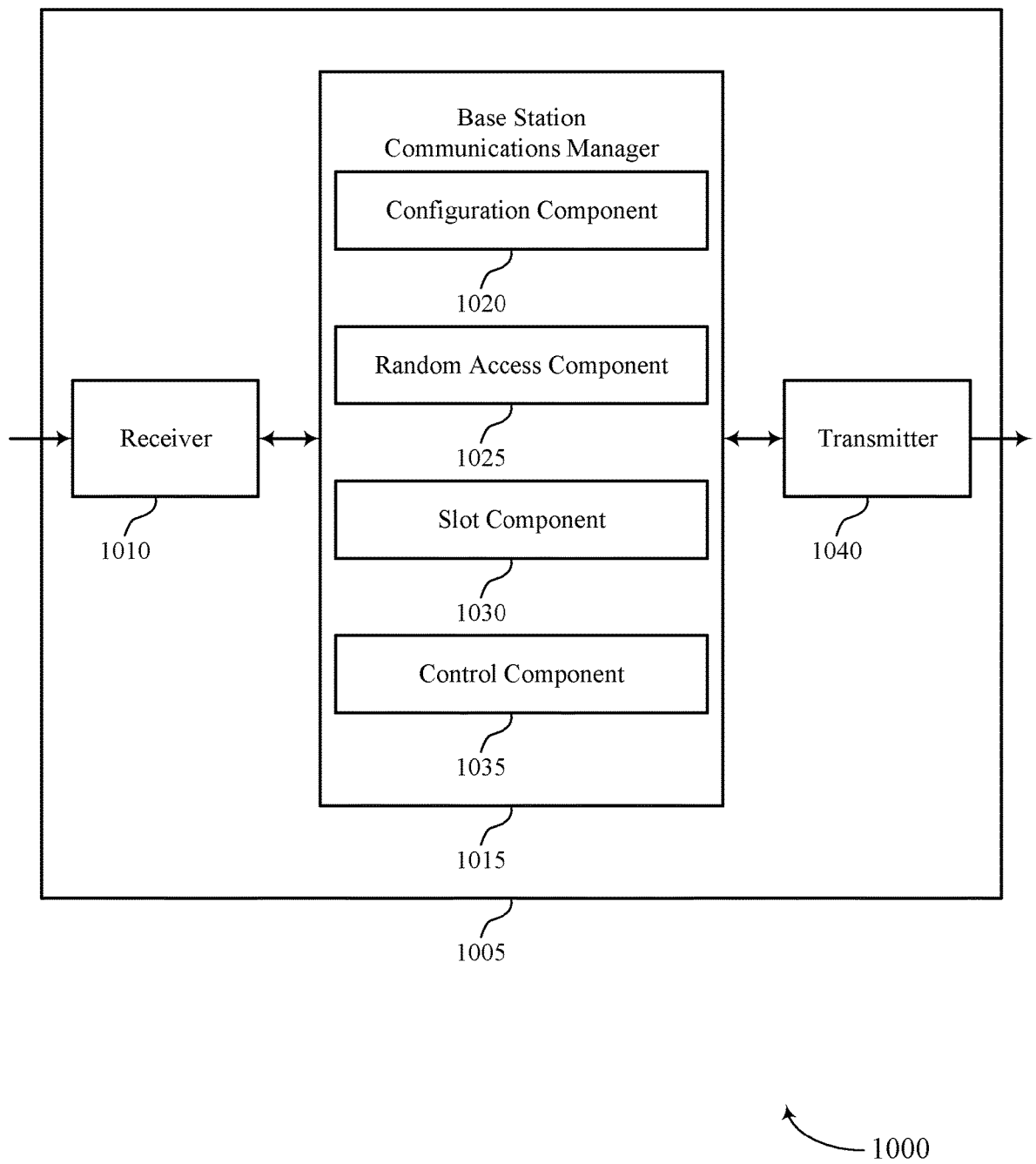

FIG. 10 shows a block diagram 1000 of a device 1005 that supports flexible message repetition for random access procedures in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to flexible message repetition for random access procedures, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a configuration component 1020, a random access component 1025, a slot component 1030, and a control component 1035. The base station communications manager 1015 may be an example of aspects of the base station communications manager 1210 described herein.

The configuration component 1020 may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances. The random access component 1025 may receive, from the UE, a random access request of the random access procedure. The slot component 1030 may select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. The control component 1035 may transmit the second quantity of instances of the control information for the UE in the first subset of slots and the third quantity of instances of the other control information for the one or more other UEs in the second subset of slots.

The transmitter 1040 may transmit signals generated by other components of the device 1005. In some examples, the transmitter 1040 may be collocated with a receiver 1010 in a transceiver component. For example, the transmitter 1040 may be an example of aspects of the transceiver 1220 described with reference to FIG. 12. The transmitter 1040 may utilize a single antenna or a set of antennas.

Figure 11:
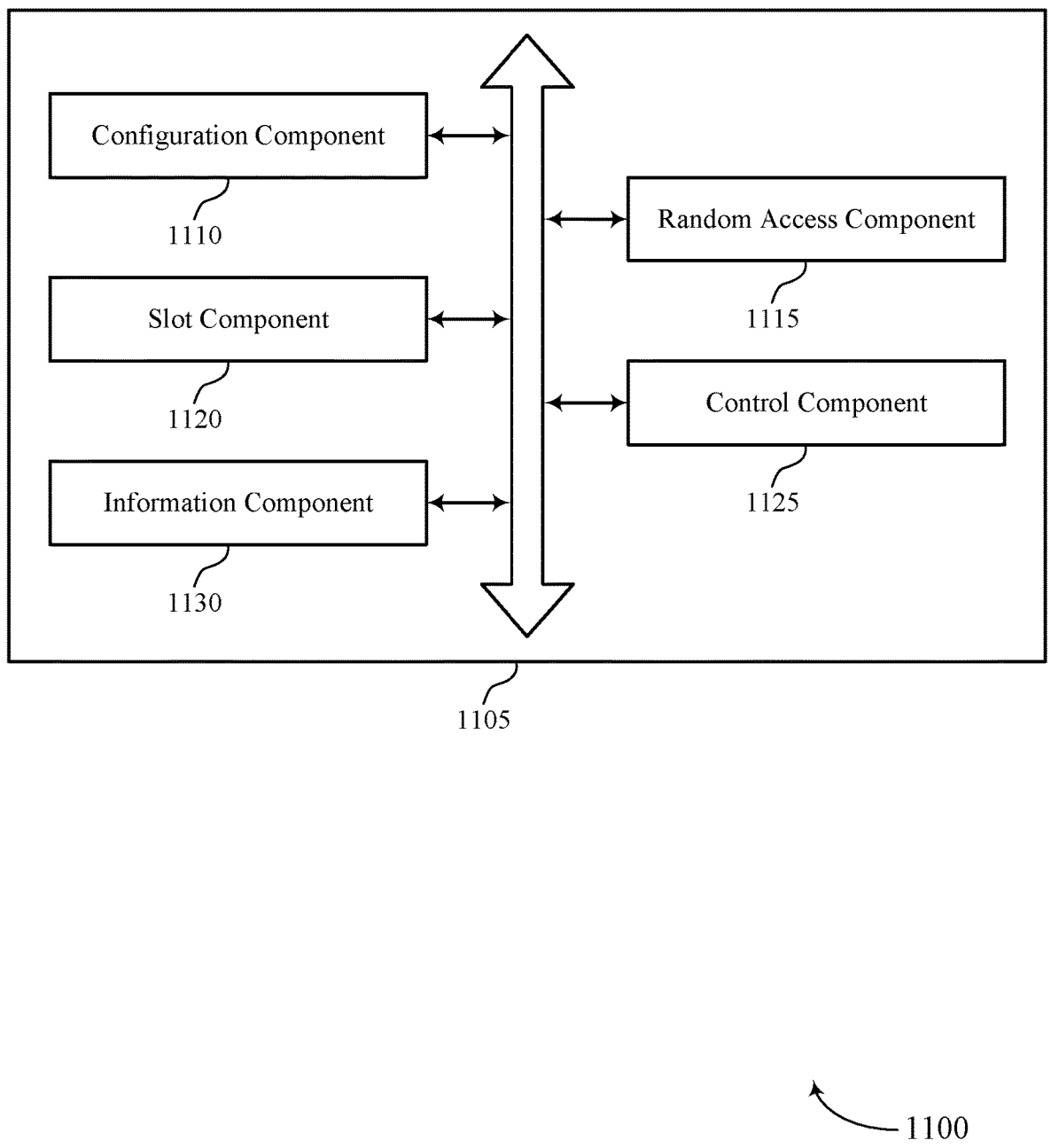
FIG. 11 shows a block diagram of a base station communications manager that supports flexible message repetition for random access procedures in accordance with aspects of the present disclosure.

FIG. 11 shows a block diagram 1100 of a base station communications manager 1105 that supports flexible message repetition for random access procedures in accordance with aspects of the present disclosure. The base station communications manager 1105 may be an example of aspects of a base station communications manager 915, a base station communications manager 1015, or a base station communications manager 1210 described herein. The base station communications manager 1105 may include a configuration component 1110, a random access component 1115, a slot component 1120, a control component 1125, and an information component 1130. Each of these components may communicate, directly or indirectly, with one another (e.g., via one or more buses).

The configuration component 1110 may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances. In some examples, the configuration component 1110 may identify, based at last in part on the configuration, the first quantity of instances of the control information for the UE in the first subset of slots of the set of slots, where the transmitting the second quantity of instances of the control information for the UE in the first subset of slots is based on the first quantity of instances of the control information for the UE. In some examples, the configuration component 1110 may transmit a configuration indicating the set of slots for the UE to receive the second quantity of instances of the control information in the first subset of slots of the set of slots. In some cases, a threshold quantity of instances of the control information for the random access response in the first subset of slots corresponds to a threshold repetition of the control information in the first subset of slots of the set of slots.

The random access component 1115 may receive, from the UE, a random access request of the random access procedure. The slot component 1120 may select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. In some cases, the first subset of slots are consecutive slots of the set of slots. In some cases, the second subset of slots are consecutive slots of the set of slots. In some cases, the first subset of slots are consecutive with the second subset of slots. In some cases, at least two slots the first subset of slots are non-consecutive slots of the set of slots.

The control component 1125 may transmit the second quantity of instances of the control information for the UE in the first subset of slots and the third quantity of instances of the other control information for the one or more other UEs in the second subset of slots. In some examples, the control component 1125 may transmit an indication of a quantity of instances of the control information for the UE in the first subset of slots of the set of slots, where the transmitting the second quantity of instances of the control information for the UE in the first subset of slots is based on the transmitting the indication of the quantity of instances of the control information for the UE. In some cases, the first quantity of instances of the control information associated with the random access response in the set of slots is based on an aggregation level for a control channel carrying the control information. In some cases, the second quantity of instances of the control information for the UE in the first subset of slots is based on the transmitted signaling indicating the configuration for the time window and an aggregation level for a control channel carrying the control information. In some cases, the second quantity of instances of the control information are carried on a control channel.

In some cases, the control channel includes a physical downlink control channel. In some cases, a sum of the second quantity of instances of the control information and the third quantity of instances of the other control information is equal to the first quantity of instances of the control information. The information component 1130 may transmit system information including an indicator of the configuration for the time window. In some cases, the system information includes a RMSI, a SIB, or a MIB, or a combination thereof.

Figure 12:
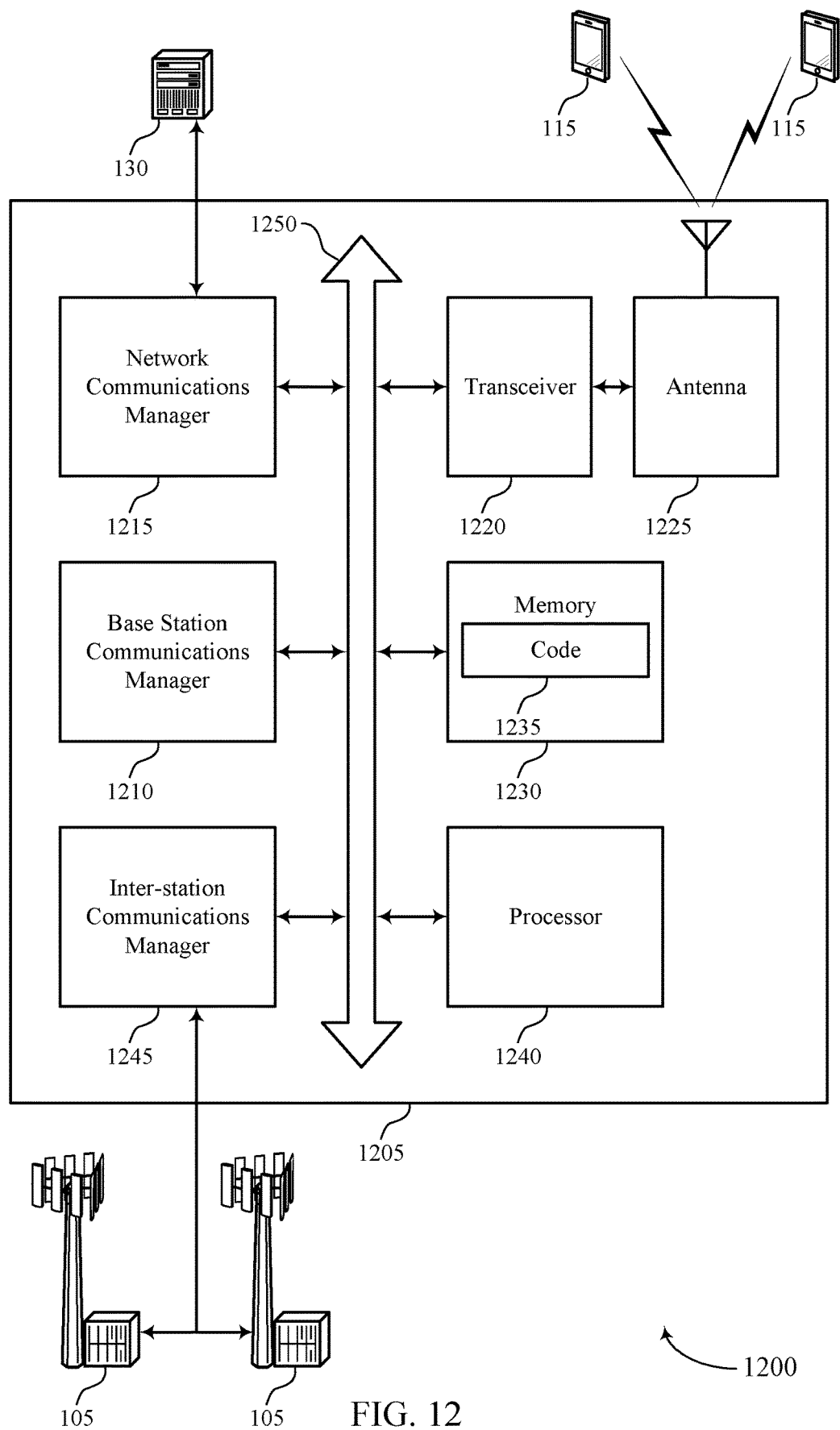
FIG. 12 shows a diagram of a system including a device that supports flexible message repetition for random access procedures in accordance with aspects of the present disclosure.

FIG. 12 shows a diagram of a system 1200 including a device 1205 that supports flexible message repetition for random access procedures in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, signaling indicating a configuration for a time window for communicating a random access response of a random access procedure. The configuration may indicate a first quantity of instances of control information associated with the random access response in a set of slots, and at least a portion of the time window configured for transmitting the first quantity of instances. The base station communications manager 1210 may receive, from the UE, a random access request of the random access procedure, select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. The base station communications manager 1210 may transmit the second quantity of instances of the control information for the UE in the first subset of slots and the third quantity of instances of the other control information for the one or more other UEs in the second subset of slots.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some examples, the device 1205 may include a single antenna 1225. However, in some examples, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting flexible message repetition for random access procedures).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
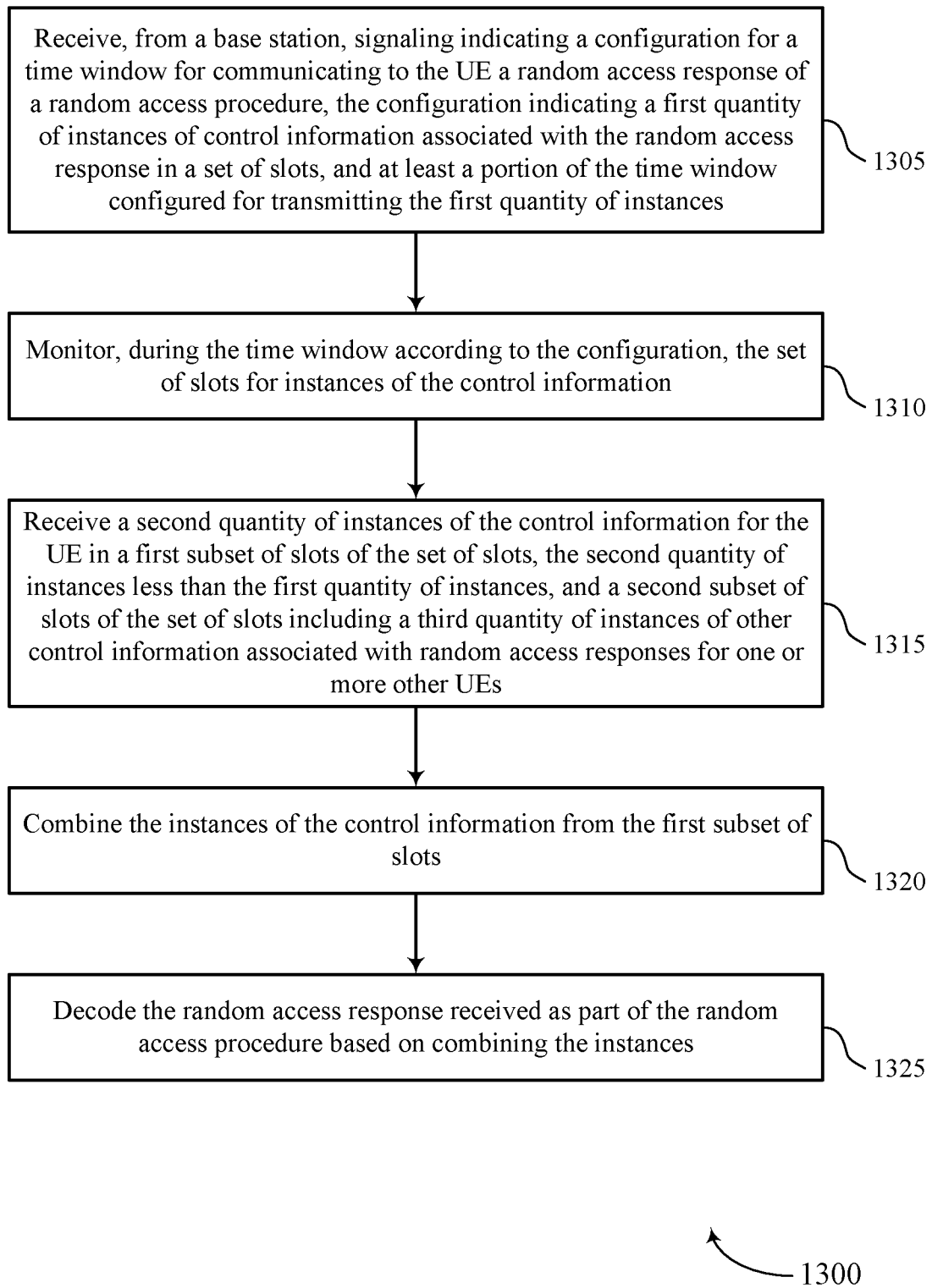
FIGS. 13 through 18 show flowcharts illustrating methods that support flexible message repetition for random access procedures in accordance with aspects of the present disclosure.

FIG. 13 shows a flowchart illustrating a method 1300 that supports flexible message repetition for random access procedures in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances. The operations of 1305 may be performed according to the methods described herein. In some examples, aspects of the operations of 1305 may be performed by a configuration component as described with reference to FIGS. 5 through 8.

At 1310, the UE may monitor, during the time window according to the configuration, the set of slots for instances of the control information. The operations of 1310 may be performed according to the methods described herein. In some examples, aspects of the operations of 1310 may be performed by a slot component as described with reference to FIGS. 5 through 8.

At 1315, the UE may receive a second quantity of instances of the control information for the UE in a first subset of slots of the set of slots, the second quantity of instances less than the first quantity of instances, and a second subset of slots of the set of slots including a third quantity of instances of other control information associated with random access responses for one or more other UEs. The operations of 1315 may be performed according to the methods described herein. In some examples, aspects of the operations of 1315 may be performed by a control component as described with reference to FIGS. 5 through 8.

At 1320, the UE may combine the instances of the control information from the first subset of slots. The operations of 1320 may be performed according to the methods described herein. In some examples, aspects of the operations of 1320 may be performed by a control component as described with reference to FIGS. 5 through 8.

At 1325, the UE may decode the random access response received as part of the random access procedure based on combining the instances. The operations of 1325 may be performed according to the methods described herein. In some examples, aspects of the operations of 1325 may be performed by a decoder component as described with reference to FIGS. 5 through 8.

Figure 14:
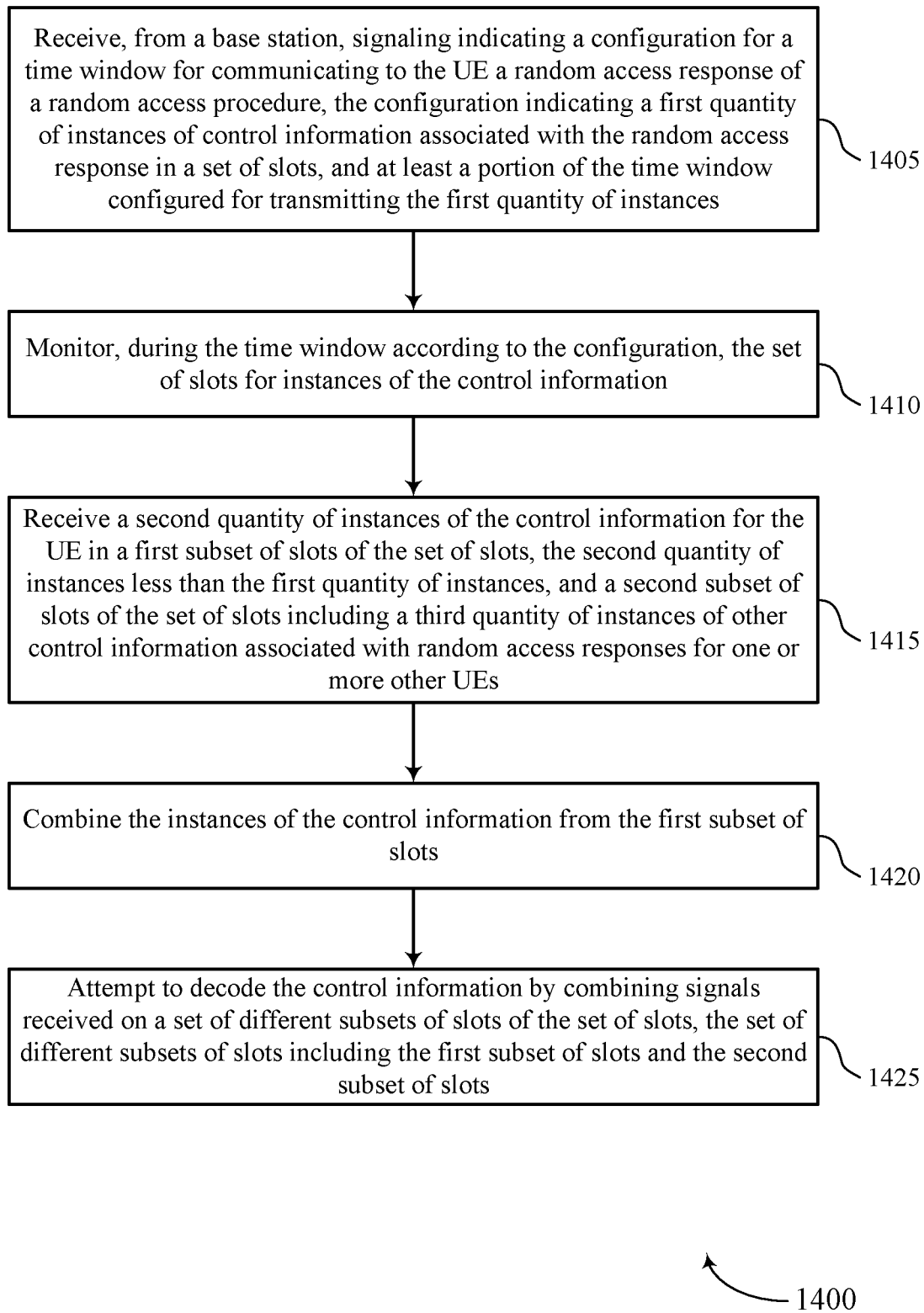

FIG. 14 shows a flowchart illustrating a method 1400 that supports flexible message repetition for random access procedures in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances. The operations of 1405 may be performed according to the methods described herein. In some examples, aspects of the operations of 1405 may be performed by a configuration component as described with reference to FIGS. 5 through 8.

At 1410, the UE may monitor, during the time window according to the configuration, the set of slots for instances of the control information. The operations of 1410 may be performed according to the methods described herein. In some examples, aspects of the operations of 1410 may be performed by a slot component as described with reference to FIGS. 5 through 8.

At 1415, the UE may receive a second quantity of instances of the control information for the UE in a first subset of slots of the set of slots, the second quantity of instances less than the first quantity of instances, and a second subset of slots of the set of slots including a third quantity of instances of other control information associated with random access responses for one or more other UEs. The operations of 1415 may be performed according to the methods described herein. In some examples, aspects of the operations of 1415 may be performed by a control component as described with reference to FIGS. 5 through 8.

At 1420, the UE may combine the instances of the control information from the first subset of slots. The operations of 1420 may be performed according to the methods described herein. In some examples, aspects of the operations of 1420 may be performed by a control component as described with reference to FIGS. 5 through 8.

At 1425, the UE may attempt to decode the control information by combining signals received on a set of different subsets of slots of the set of slots, the set of different subsets of slots including the first subset of slots and the second subset of slots. The operations of 1425 may be performed according to the methods described herein. In some examples, aspects of the operations of 1425 may be performed by a decoder component as described with reference to FIGS. 5 through 8.

Figure 15:
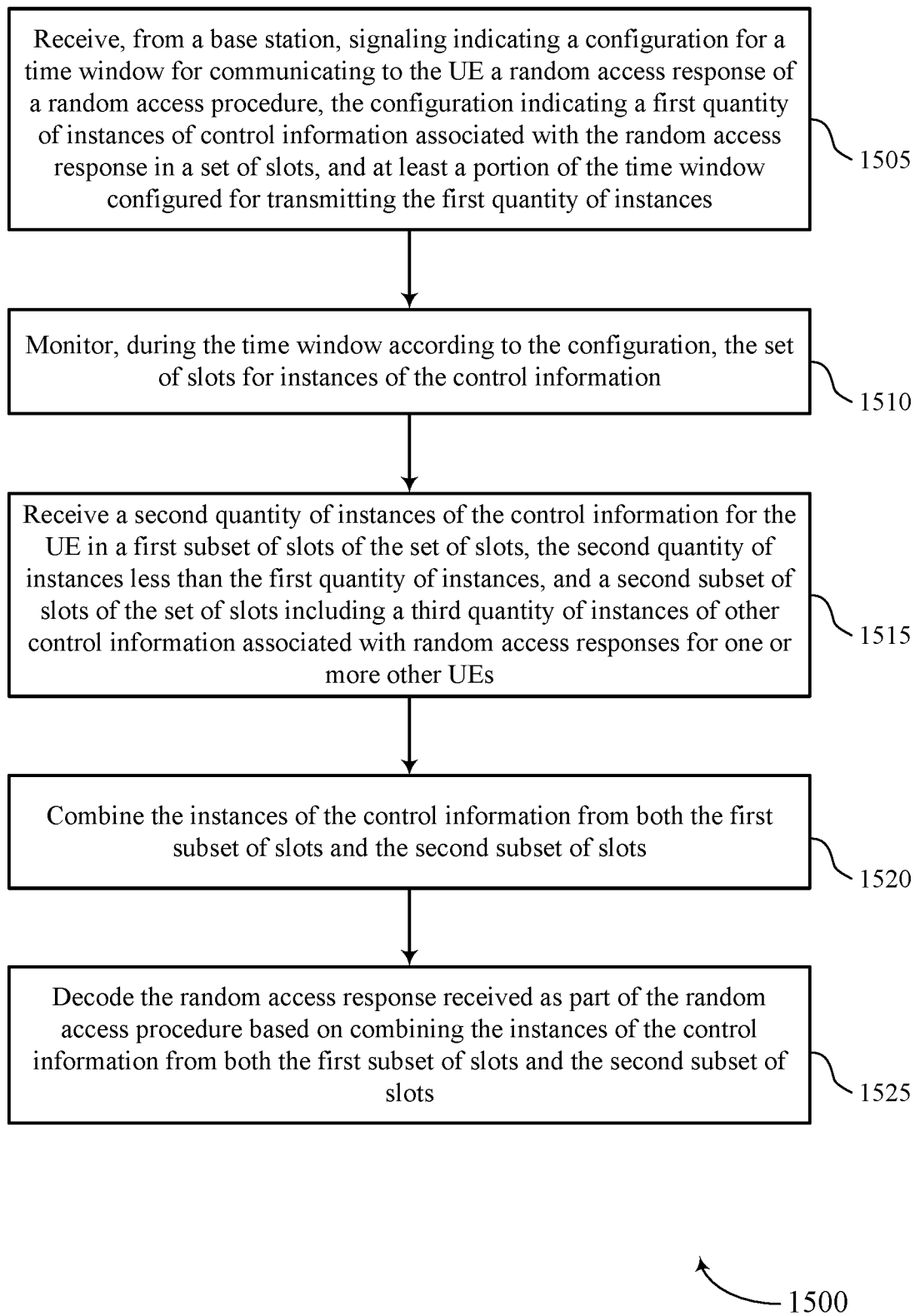

FIG. 15 shows a flowchart illustrating a method 1500 that supports flexible message repetition for random access procedures in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, signaling indicating a configuration for a time window for communicating to the UE a random access response of a random access procedure, the configuration indicating a first quantity of instances of control information associated with the random access response in a set of slots, and at least a portion of the time window configured for transmitting the first quantity of instances. The operations of 1505 may be performed according to the methods described herein. In some examples, aspects of the operations of 1505 may be performed by a configuration component as described with reference to FIGS. 5 through 8.

At 1510, the UE may monitor, during the time window according to the configuration, the set of slots for instances of the control information. The operations of 1510 may be performed according to the methods described herein. In some examples, aspects of the operations of 1510 may be performed by a slot component as described with reference to FIGS. 5 through 8.

At 1515, the UE may receive a second quantity of instances of the control information for the UE in a first subset of slots of the set of slots, the second quantity of instances less than the first quantity of instances, and a second subset of slots of the set of slots including a third quantity of instances of other control information associated with random access responses for one or more other UEs. The operations of 1515 may be performed according to the methods described herein. In some examples, aspects of the operations of 1515 may be performed by a control component as described with reference to FIGS. 5 through 8.

At 1520, the UE may combine the instances of the control information from both the first subset of slots and the second subset of slots. The operations of 1520 may be performed according to the methods described herein. In some examples, aspects of the operations of 1520 may be performed by a control component as described with reference to FIGS. 5 through 8.

At 1525, the UE may decode the random access response received as part of the random access procedure based on combining the instances of the control information from both the first subset of slots and the second subset of slots. The operations of 1525 may be performed according to the methods described herein. In some examples, aspects of the operations of 1525 may be performed by a decoder component as described with reference to FIGS. 5 through 8.

Figure 16:
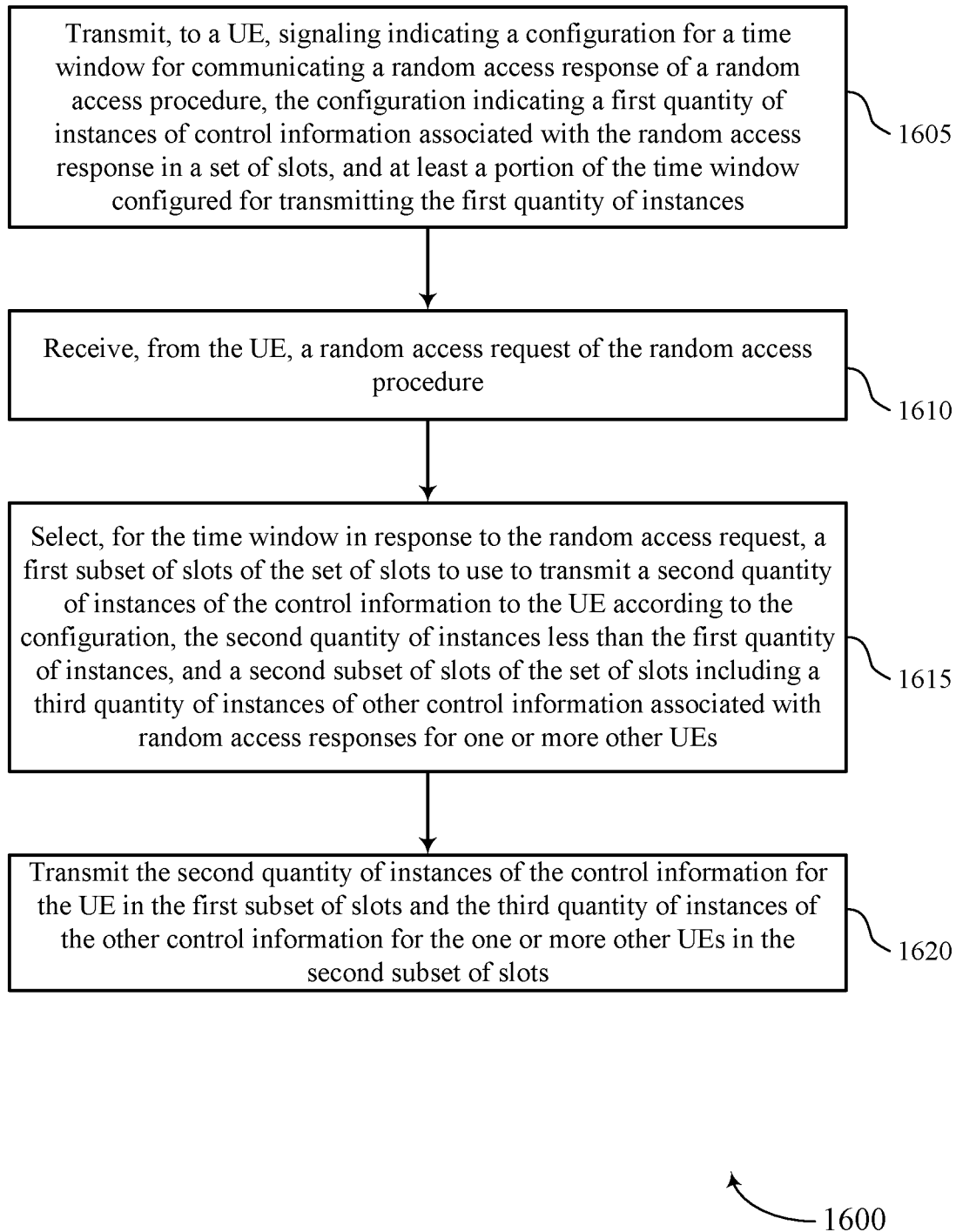

FIG. 16 shows a flowchart illustrating a method 1600 that supports flexible message repetition for random access procedures in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances. The operations of 1605 may be performed according to the methods described herein. In some examples, aspects of the operations of 1605 may be performed by a configuration component as described with reference to FIGS. 9 through 12.

At 1610, the base station may receive, from the UE, a random access request of the random access procedure. The operations of 1610 may be performed according to the methods described herein. In some examples, aspects of the operations of 1610 may be performed by a random access component as described with reference to FIGS. 9 through 12.

At 1615, the base station may select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. The operations of 1615 may be performed according to the methods described herein. In some examples, aspects of the operations of 1615 may be performed by a slot component as described with reference to FIGS. 9 through 12.

At 1620, the base station may transmit the second quantity of instances of the control information for the UE in the first subset of slots and the third quantity of instances of the other control information for the one or more other UEs in the second subset of slots. The operations of 1620 may be performed according to the methods described herein. In some examples, aspects of the operations of 1620 may be performed by a control component as described with reference to FIGS. 9 through 12.

Figure 17:
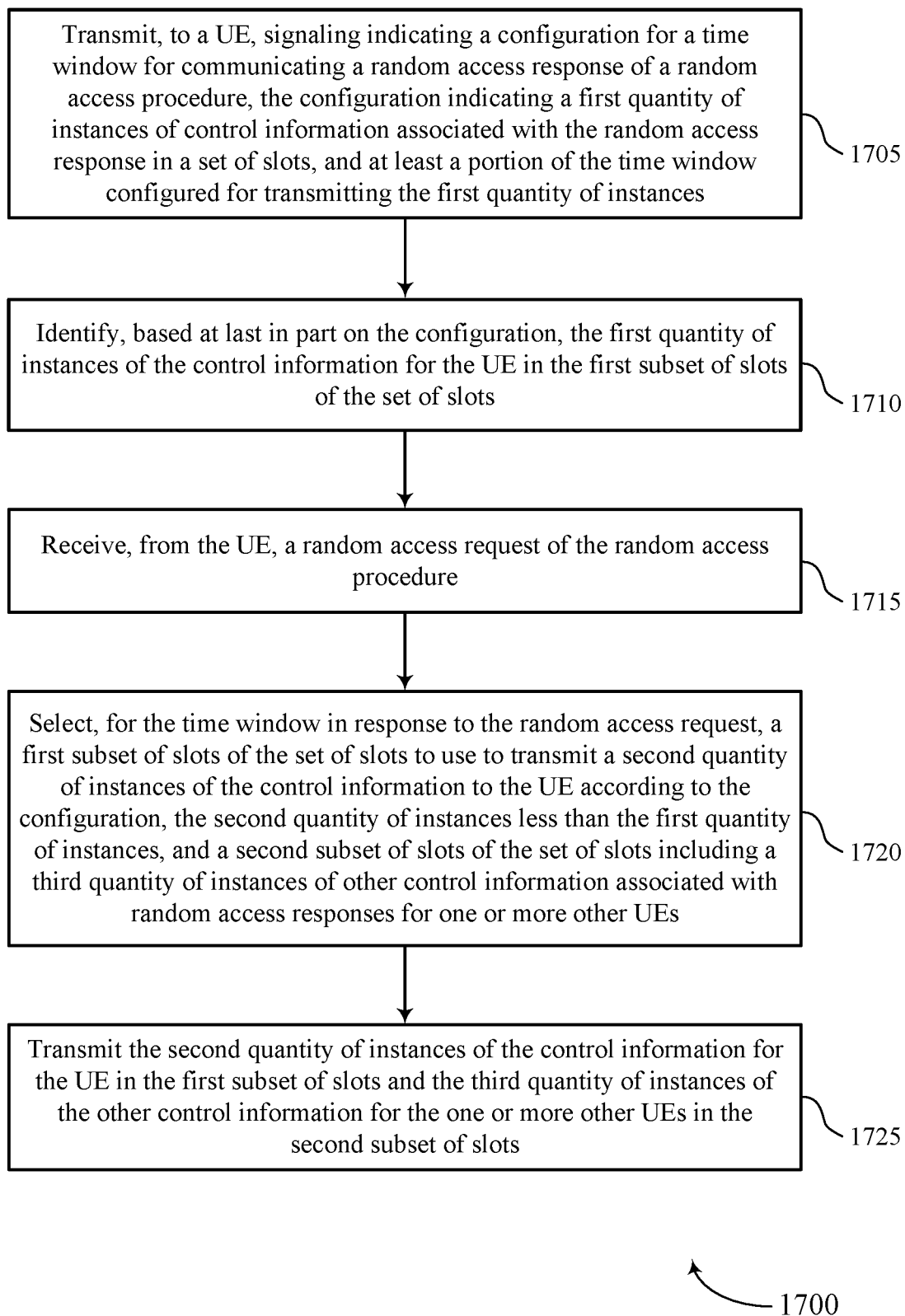

FIG. 17 shows a flowchart illustrating a method 1700 that supports flexible message repetition for random access procedures in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances. The operations of 1705 may be performed according to the methods described herein. In some examples, aspects of the operations of 1705 may be performed by a configuration component as described with reference to FIGS. 9 through 12.

At 1710, the base station may transmit an indication of a quantity of instances of the control information for the UE in the first subset of slots of the plurality of slots. The operations of 1710 may be performed according to the methods described herein. In some examples, aspects of the operations of 1710 may be performed by a control component as described with reference to FIGS. 9 through 12.

At 1715, the base station may receive, from the UE, a random access request of the random access procedure. The operations of 1715 may be performed according to the methods described herein. In some examples, aspects of the operations of 1715 may be performed by a random access component as described with reference to FIGS. 9 through 12.

At 1720, the base station may select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. The operations of 1720 may be performed according to the methods described herein. In some examples, aspects of the operations of 1720 may be performed by a slot component as described with reference to FIGS. 9 through 12.

At 1725, the base station may transmit the second quantity of instances of the control information for the UE in the first subset of slots and the third quantity of instances of the other control information for the one or more other UEs in the second subset of slots. The operations of 1725 may be performed according to the methods described herein. In some examples, aspects of the operations of 1725 may be performed by a control component as described with reference to FIGS. 9 through 12.

Figure 18:
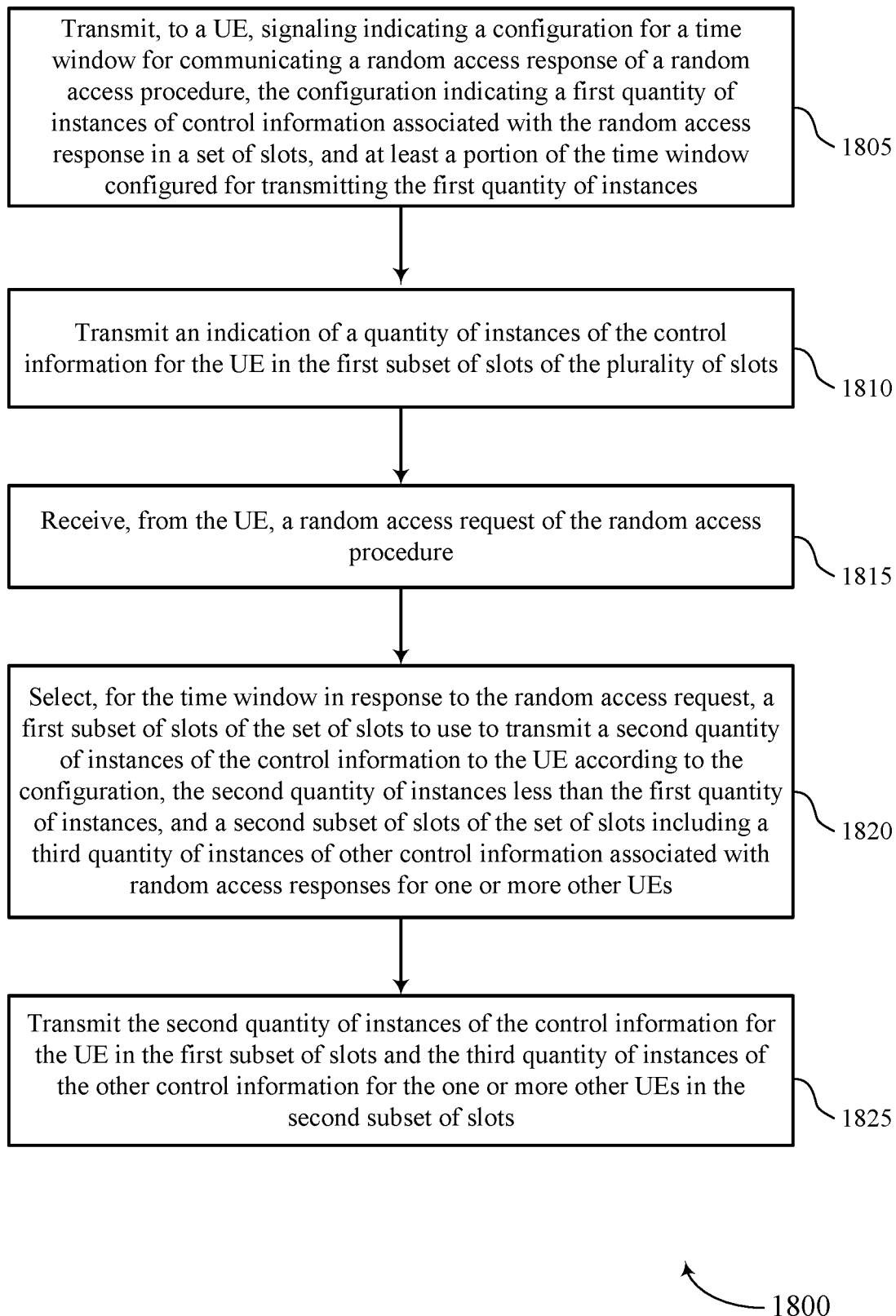

FIG. 18 shows a flowchart illustrating a method 1800 that supports flexible message repetition for random access procedures in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, signaling indicating a configuration for a time window for communicating a random access response of a random access procedure, the configuration indicating a first quantity of instances of control information associated with the random access response in a set of slots, and at least a portion of the time window configured for transmitting the first quantity of instances. The operations of 1805 may be performed according to the methods described herein. In some examples, aspects of the operations of 1805 may be performed by a configuration component as described with reference to FIGS. 9 through 12.

At 1810, the base station may identify, based at last in part on the configuration, the first quantity of instances of the control information for the UE in the first subset of slots of the set of slots. The operations of 1810 may be performed according to the methods described herein. In some examples, aspects of the operations of 1810 may be performed by a configuration component as described with reference to FIGS. 9 through 12.

At 1815, the base station may receive, from the UE, a random access request of the random access procedure. The operations of 1815 may be performed according to the methods described herein. In some examples, aspects of the operations of 1815 may be performed by a random access component as described with reference to FIGS. 9 through 12.

At 1820, the base station may select, for the time window in response to the random access request, a first subset of slots of the set of slots to use to transmit a second quantity of instances of the control information to the UE according to the configuration, the second quantity of instances less than the first quantity of instances, and a second subset of slots of the set of slots including a third quantity of instances of other control information associated with random access responses for one or more other UEs. The operations of 1820 may be performed according to the methods described herein. In some examples, aspects of the operations of 1820 may be performed by a slot component as described with reference to FIGS. 9 through 12.

At 1825, the base station may transmit the second quantity of instances of the control information for the UE in the first subset of slots and the third quantity of instances of the other control information for the one or more other UEs in the second subset of slots. The operations of 1825 may be performed according to the methods described herein. In some examples, aspects of the operations of 1825 may be performed by a control component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, signaling indicating a configuration for a time window for communicating to the UE a random access response of a random access procedure, the configuration indicating a first quantity of instances of control information associated with the random access response in a plurality of slots, and at least a portion of the time window configured for transmitting the first quantity of instances; monitoring, during the time window according to the configuration, the plurality of slots for instances of the control information; receiving a second quantity of instances of the control information for the UE in a first subset of slots of the plurality of slots, the second quantity of instances less than the first quantity of instances, and a second subset of slots of the plurality of slots including a third quantity of instances of other control information associated with random access responses for one or more other UEs; combining the instances of the control information from the first subset of slots; and decoding the random access response received as part of the random access procedure based at least in part on combining the instances.

Aspect 2: The method of aspect 1, further comprising: attempting to decode the control information by combining signals received on a plurality of different subsets of slots of the plurality of slots, the plurality of different subsets of slots including the first subset of slots and the second subset of slots.

Aspect 3: The method of any of aspects 1 through 2, wherein the combining of the instances of the control information comprises: combining the instances of the control information from both the first subset of slots and the second subset of slots, wherein the decoding the random access response is based at least in part on the combining the instances of the control information from both the first subset of slots and the second subset of slots.

Aspect 4: The method of any of aspects 1 through 3, further comprising: identifying, based at last in part on the configuration, the first quantity of instances of the control information for the random access response in the first subset of slots of the plurality of slots, wherein the monitoring the plurality of slots for the instances of the control information for the UE is based at least in part on the first quantity of instances.

Aspect 5: The method of aspect 4, wherein the first quantity of instances of the control information corresponds to a maximum repetition value of the control information.

Aspect 6: The method of any of aspects 1 through 5, further comprising: receiving, from the base station, an indication of a quantity of instances of the control information for the random access response in the first subset of slots of the plurality of slots.

Aspect 7: The method of aspect 6, wherein the monitoring of the plurality of slots for the instances of the control information for the UE comprises: monitoring the first subset of slots of the plurality of slots based at least in part on receiving the indication of the quantity of instances of the control information.

Aspect 8: The method of aspect 7, wherein the quantity of instances of the control information correspond to a repetition of the control information over the first subset of slots of the plurality of slots.

Aspect 9: The method of any of aspects 7 through 8, wherein the quantity of instances of the control information for the random access response in the first subset of slots is less than a threshold quantity of instances of the control information for the random access response in the first subset of slots.

Aspect 10: The method of any of aspects 7 through 9, wherein the second quantity of instances of the control information associated with the random access response in the first subset of slots is based at least in part on receiving the indication and an aggregation level for a control channel carrying the control information.

Aspect 11: The method of any of aspects 1 through 10, further comprising: receiving system information including an indicator of the configuration for the time window, wherein the system information comprises a remaining minimum system information, a system information block, or a master information block, or any combination thereof.

Aspect 12: The method of any of aspects 1 through 11, further comprising: performing a parity check on the combination of the instances of the random access response, the parity check comprising a cyclic redundancy check, wherein decoding the random access response is based at least in part on performing the parity check.

Aspect 13: The method of any of aspects 1 through 12, wherein the instances of the control information are carried on a physical downlink control channel.

Aspect 14: The method of any of aspects 1 through 13, wherein the first subset of slots or the second subset of slots, or both, are consecutive slots of the plurality of slots.

Aspect 15: The method of any of aspects 1 through 14, wherein at least two slots of the first subset of slots are non-consecutive slots of the plurality of slots.

Aspect 16: The method of any of aspects 1 through 15, wherein a sum of the second quantity of instances of the control information and the third quantity of instances of the other control information is equal to the first quantity of instances of the control information.

Aspect 17: A method for wireless communication at a base station, comprising: transmitting, to a UE, signaling indicating a configuration for a time window for communicating a random access response of a random access procedure, the configuration indicating a first quantity of instances of control information associated with the random access response in a plurality of slots, and at least a portion of the time window configured for transmitting the first quantity of instances; receiving, from the UE, a random access request of the random access procedure; selecting, for the time window in response to the random access request, a first subset of slots of the plurality of slots to use to transmit a second quantity of instances of the control information to the UE according to the configuration, the second quantity of instances less than the first quantity of instances, and a second subset of slots of the plurality of slots including a third quantity of instances of other control information associated with random access responses for one or more other UEs; and transmitting the second quantity of instances of the control information for the UE in the first subset of slots and the third quantity of instances of the other control information for the one or more other UEs in the second subset of slots.

Aspect 18: The method of aspect 17, further comprising: identifying, based at last in part on the configuration, the first quantity of instances of the control information for the UE in the first subset of slots of the plurality of slots, wherein the transmitting the second quantity of instances of the control information for the UE in the first subset of slots is based at least in part on the first quantity of instances of the control information for the UE.

Aspect 19: The method of aspect 18, wherein a threshold quantity of instances of the control information for the random access response in the first subset of slots corresponds to a threshold repetition of the control information in the first subset of slots of the plurality of slots.

Aspect 20: The method of any of aspects 17 through 19, further comprising: transmitting an indication of a quantity of instances of the control information for the UE in the first subset of slots of the plurality of slots, wherein the transmitting the second quantity of instances of the control information for the UE in the first subset of slots is based at least in part on the transmitting the indication of the quantity of instances of the control information for the UE.

Aspect 21: The method of any of aspects 17 through 20, further comprising: transmitting a configuration indicating the plurality of slots for the UE to receive the second quantity of instances of the control information in the first subset of slots of the plurality of slots.

Aspect 22: The method of any of aspects 17 through 21, wherein the first quantity of instances of the control information associated with the random access response in the plurality of slots is based at least in part on an aggregation level for a control channel carrying the control information.

Aspect 23: The method of any of aspects 17 through 22, wherein the second quantity of instances of the control information for the UE in the first subset of slots is based at least in part on the transmitted signaling indicating the configuration for the time window and an aggregation level for a control channel carrying the control information.

Aspect 24: The method of any of aspects 17 through 23, further comprising: transmitting system information including an indicator of the configuration for the time window, wherein the system information comprises a remaining minimum system information, a system information block, or a master information block, or a combination thereof.

Aspect 25: The method of any of aspects 17 through 24, wherein the second quantity of instances of the control information are carried on a physical downlink control channel.

Aspect 26: The method of any of aspects 17 through 25, wherein the first subset of slots or the second subset of slots, or both, are consecutive slots of the plurality of slots.

Aspect 27: The method of any of aspects 17 through 26, wherein at least two slots of the first subset of slots are non-consecutive slots of the plurality of slots.

Aspect 28: The method of any of aspects 17 through 27, wherein a sum of the second quantity of instances of the control information and the third quantity of instances of the other control information is equal to the first quantity of instances of the control information.

Aspect 29: An apparatus for wireless communication at a UE, comprising a processor; memory coupled with the processor; and instructions stored in the memory and executable by the processor to cause the apparatus to perform a method of any of aspects 1 through 16.

Aspect 30: An apparatus for wireless communication at a UE, comprising at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communication at a base station, comprising a processor; memory coupled with the processor; and instructions stored in the memory and executable by the processor to cause the apparatus to perform a method of any of aspects 17 through 28.

Aspect 33: An apparatus for wireless communication at a base station, comprising at least one means for performing a method of any of aspects 17 through 28.

Aspect 34: A non-transitory computer-readable medium storing code for wireless communication at a base station, the code comprising instructions executable by a processor to perform a method of any of aspects 17 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity, signaling indicating a configuration for a time window for communicating to the UE a random access response of a random access procedure, the configuration indicating a first quantity of instances of control information associated with the random access response in a plurality of slots, and at least a portion of the time window configured for transmitting the first quantity of instances;
monitoring, during the time window according to the configuration, the plurality of slots for instances of the control information;
receiving a second quantity of instances of the control information for the UE in a first subset of slots of the plurality of slots, the second quantity of instances less than the first quantity of instances, and a second subset of slots of the plurality of slots including a third quantity of instances of other control information associated with random access responses for one or more other UEs, wherein the second quantity of instances is based at least in part on an aggregation level for a control channel carrying the control information;
combining the instances of the control information from the first subset of slots; and
decoding the random access response received as part of the random access procedure based at least in part on combining the instances.

2. The method of claim 1, further comprising:
attempting to decode the control information by combining signals received on a plurality of different subsets of slots of the plurality of slots, the plurality of different subsets of slots including the first subset of slots and the second subset of slots.

3. The method of claim 1, wherein the combining of the instances of the control information comprises:
combining the instances of the control information from both the first subset of slots and the second subset of slots, wherein the decoding the random access response is based at least in part on the combining the instances of the control information from both the first subset of slots and the second subset of slots.

4. The method of claim 1, further comprising:
identifying, based at last in part on the configuration, the first quantity of instances of the control information for the random access response in the first subset of slots of the plurality of slots, wherein the monitoring the plurality of slots for the instances of the control information for the UE is based at least in part on the first quantity of instances.

5. The method of claim 4, wherein the first quantity of instances of the control information corresponds to a maximum repetition value of the control information.

6. The method of claim 1, further comprising:
receiving, from the network entity, an indication of a quantity of instances of the control information for the random access response in the first subset of slots of the plurality of slots.

7. The method of claim 6, wherein the monitoring of the plurality of slots for the instances of the control information for the UE comprises:
monitoring the first subset of slots of the plurality of slots based at least in part on receiving the indication of the quantity of instances of the control information.

8. The method of claim 7, wherein the quantity of instances of the control information correspond to a repetition of the control information over the first subset of slots of the plurality of slots.

9. The method of claim 7, wherein the quantity of instances of the control information for the random access response in the first subset of slots is less than a threshold quantity of instances of the control information for the random access response in the first subset of slots.

10. The method of claim 7, wherein the second quantity of instances of the control information associated with the random access response in the first subset of slots is based at least in part on receiving the indication and the aggregation level for the control channel carrying the control information.

11. The method of claim 1, further comprising:
receiving system information including an indicator of the configuration for the time window, wherein the system information comprises a remaining minimum system information, a system information block, or a master information block, or any combination thereof.

12. The method of claim 1, further comprising:
performing a parity check on the combination of the instances of the random access response, the parity check comprising a cyclic redundancy check, wherein decoding the random access response is based at least in part on performing the parity check.

13. The method of claim 1, wherein the instances of the control information are carried on a physical downlink control channel.

14. The method of claim 1, wherein the first subset of slots or the second subset of slots, or both, are consecutive slots of the plurality of slots.

15. The method of claim 1, wherein at least two slots of the first subset of slots are non-consecutive slots of the plurality of slots.

16. The method of claim 1, wherein a sum of the second quantity of instances of the control information and the third quantity of instances of the other control information is equal to the first quantity of instances of the control information.

17. A method for wireless communication at a network entity, comprising:
transmitting, to a user equipment (UE), signaling indicating a configuration for a time window for communicating a random access response of a random access procedure, the configuration indicating a first quantity of instances of control information associated with the random access response in a plurality of slots, and at least a portion of the time window configured for transmitting the first quantity of instances;
receiving, from the UE, a random access request of the random access procedure;
selecting, for the time window in response to the random access request, a first subset of slots of the plurality of slots to use to transmit a second quantity of instances of the control information to the UE according to the configuration, the second quantity of instances less than the first quantity of instances, and a second subset of slots of the plurality of slots including a third quantity of instances of other control information associated with random access responses for one or more other UEs, wherein the second quantity of instances is based at least in part on an aggregation level for a control channel carrying the control information; and transmitting the second quantity of instances of the control information for the UE in the first subset of slots and the third quantity of instances of the other control information for the one or more other UEs in the second subset of slots.

18. The method of claim 17, further comprising:
identifying, based at last in part on the configuration, the first quantity of instances of the control information for the UE in the first subset of slots of the plurality of slots, wherein the transmitting the second quantity of instances of the control information for the UE in the first subset of slots is based at least in part on the first quantity of instances of the control information for the UE.

19. The method of claim 18, wherein a threshold quantity of instances of the control information for the random access response in the first subset of slots corresponds to a threshold repetition of the control information in the first subset of slots of the plurality of slots.

20. The method of claim 17, further comprising:
transmitting an indication of a quantity of instances of the control information for the UE in the first subset of slots of the plurality of slots, wherein the transmitting the second quantity of instances of the control information for the UE in the first subset of slots is based at least in part on the transmitting the indication of the quantity of instances of the control information for the UE.

21. The method of claim 17, further comprising:
transmitting a second configuration indicating the plurality of slots for the UE to receive the second quantity of instances of the control information in the first subset of slots of the plurality of slots.

22. The method of claim 17, wherein the first quantity of instances of the control information associated with the random access response in the plurality of slots is based at least in part on the aggregation level for the control channel carrying the control information.

23. The method of claim 17, wherein the second quantity of instances of the control information for the UE in the first subset of slots is based at least in part on the transmitted signaling indicating the configuration for the time window and the aggregation level for the control channel carrying the control information.

24. The method of claim 17, further comprising:
transmitting system information including an indicator of the configuration for the time window, wherein the system information comprises a remaining minimum system information, a system information block, or a master information block, or a combination thereof.

25. The method of claim 17, wherein the second quantity of instances of the control information are carried on a physical downlink control channel.

26. The method of claim 17, wherein the first subset of slots or the second subset of slots, or both, are consecutive slots of the plurality of slots.

27. The method of claim 17, wherein at least two slots of the first subset of slots are non-consecutive slots of the plurality of slots.

28. The method of claim 17, wherein a sum of the second quantity of instances of the control information and the third quantity of instances of the other control information is equal to the first quantity of instances of the control information.

29. An apparatus for wireless communication, comprising:
a processor,
memory coupled with the processor; and
instructions stored in the memory and operable, when executed by the processor, to cause the apparatus to:
receive, from a network entity, signaling indicating a configuration for a time window for communicating to the apparatus a random access response of a random access procedure, the configuration indicating a first quantity of instances of control information associated with the random access response in a plurality of slots, and at least a portion of the time window configured for transmitting the first quantity of instances;
monitor, during the time window according to the configuration, the plurality of slots for instances of the control information;
receive a second quantity of instances of the control information for the apparatus in a first subset of slots of the plurality of slots, the second quantity of instances less than the first quantity of instances, and a second subset of slots of the plurality of slots including a third quantity of instances of other control information associated with random access responses for one or more other apparatuses, wherein the second quantity of instances is based at least in part on an aggregation level for a control channel carrying the control information;
combine the instances of the control information from the first subset of slots; and
decode the random access response received as part of the random access procedure based at least in part on combining the instances.

30. An apparatus for wireless communication, comprising:
a processor,
memory coupled with the processor; and
instructions stored in the memory and operable, when executed by the processor, to cause the apparatus to:
transmit, to a user equipment (UE), signaling indicating a configuration for a time window for communicating a random access response of a random access procedure, the configuration indicating a first quantity of instances of control information associated with the random access response in a plurality of slots, and at least a portion of the time window configured for transmitting the first quantity of instances;
receive, from the UE, a random access request of the random access procedure;
select, for the time window in response to the random access request, a first subset of slots of the plurality of slots to use to transmit a second quantity of instances of the control information to the UE according to the configuration, the second quantity of instances less than the first quantity of instances, and a second subset of slots of the plurality of slots including a third quantity of instances of other control information associated with random access responses for one or more other UEs, wherein the second quantity of instances is based at least in part on an aggregation level for a control channel carrying the control information; and transmit the second quantity of instances of the control information for the UE in the first subset of slots and the third quantity of instances of the other control information for the one or more other UEs in the second subset of slots.

\* \* \* \* \*